(12) United States Patent
Fedorchak et al.

(10) Patent No.: US 12,491,263 B2
(45) Date of Patent: Dec. 9, 2025

(54) POLYMER-BASED IMPLANT FOR RETINAL THERAPY AND METHODS OF MAKING AND USING THE SAME

(71) Applicant: University of Pittsburgh - Of the Commonwealth System of Higher Education, Pittsburgh, PA (US)

(72) Inventors: Morgan Fedorchak, Mars, PA (US); Leah Byrne, Pittsburgh, PA (US); José-Alain Sahel, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 809 days.

(21) Appl. No.: 17/610,389

(22) PCT Filed: May 12, 2020

(86) PCT No.: PCT/US2020/032496
§ 371 (c)(1),
(2) Date: Nov. 10, 2021

(87) PCT Pub. No.: WO2020/232005
PCT Pub. Date: Nov. 19, 2020

(65) Prior Publication Data
US 2022/0249700 A1    Aug. 11, 2022

Related U.S. Application Data

(60) Provisional application No. 62/846,966, filed on May 13, 2019.

(51) Int. Cl.
| | | |
|---|---|---|
| *A61K 48/00* | (2006.01) | |
| *A61K 9/00* | (2006.01) | |
| *A61L 27/18* | (2006.01) | |
| *A61L 27/54* | (2006.01) | |
| *A61P 27/02* | (2006.01) | |
| *C08G 65/337* | (2006.01) | |

(52) U.S. Cl.
CPC ........ *A61K 48/0041* (2013.01); *A61K 9/0051* (2013.01); *A61L 27/18* (2013.01); *A61L 27/54* (2013.01); *A61P 27/02* (2018.01); *C08G 65/337* (2013.01); *A61L 2300/258* (2013.01); *A61L 2400/06* (2013.01); *A61L 2430/16* (2013.01)

(58) Field of Classification Search
CPC ... C08G 65/337; A61P 27/02; A61K 48/0041; A61K 9/0051; A61L 27/18; A61L 27/54; A61L 2300/258; A61L 2400/06; A61L 2430/16
See application file for complete search history.

(56) References Cited

U.S. PATENT DOCUMENTS

| | | | |
|---|---|---|---|
| 7,074,424 B2 | 7/2006 | Avila et al. | |
| 7,163,697 B2 | 1/2007 | Hanes et al. | |
| 7,195,774 B2* | 3/2007 | Carvalho | A61F 9/0017 424/427 |
| 7,297,348 B2* | 11/2007 | Li | A61K 9/0024 424/485 |
| 7,687,592 B2 | 3/2010 | Runnels et al. | |
| 8,987,339 B2 | 3/2015 | Askari et al. | |
| 10,137,104 B2 | 11/2018 | Maneval et al. | |
| 2003/0045498 A1 | 3/2003 | Kovesdi et al. | |
| 2005/0163844 A1 | 7/2005 | Ashton | |
| 2007/0048349 A1 | 3/2007 | Salamone et al. | |
| 2008/0089923 A1 | 4/2008 | Burkstrand et al. | |
| 2016/0095695 A1 | 4/2016 | Altman et al. | |
| 2017/0056412 A1* | 3/2017 | Ghebremeskel | A61P 27/06 |
| 2018/0333488 A1 | 11/2018 | Francois et al. | |
| 2025/0017769 A1 | 1/2025 | DiLeo et al. | |

FOREIGN PATENT DOCUMENTS

| | | | |
|---|---|---|---|
| TW | 2016/25792 | 7/2016 | |
| WO | WO 2004/093786 | 11/2004 | |
| WO | WO 2014/138085 | 9/2014 | |
| WO | WO 2015/168666 | 11/2015 | |
| WO | WO 2016/191645 | 12/2016 | |
| WO | WO-2016191645 A1 * | 12/2016 | ........... A61F 9/0017 |
| WO | WO 2017/165449 | 9/2017 | |
| WO | WO 2019/099630 | 5/2019 | |
| WO | WO 2019/118330 | 6/2019 | |
| WO | WO 2020/186082 | 9/2020 | |
| WO | WO 2020/222195 A1 | 11/2020 | |

OTHER PUBLICATIONS

Guangzhou Ding, et al, Micelle Formation from Hydrophobically End-Capped Poly(ethylene Oxide) and its Application for Delivery of Poorly Water-Soluble Drug, 294 Colloid. Polym. Sci. 77 (Year: 2016).*
Zinghua Liu, et al, Hydrophobic Modifications of Cationic Polymers for Gene Delivery, 35 Prog. Polym. Sci. 1144 (Year: 2010).*
Annaka et al., "Design of an injectable in situ gelation biomaterials for vitreous substitute," *BioMacromolecules*, 12(11): 4011-4021, Oct. 20, 2011.

(Continued)

*Primary Examiner* — Sean M Basquill
(74) *Attorney, Agent, or Firm* — Klarquist Sparkman, LLP

(57) ABSTRACT

Disclosed herein are embodiments of a polymer-based implant and methods of making and using the same. The polymer-based implant comprises a polymer component and a therapeutic agent. In some embodiments, the polymer-based implant can be used to treat and/or prevent retinal diseases and/or retinopathies. The polymer-based implant exhibits physical properties that provide the ability to safely place the polymer-based implant in an ocular region without undesired diffusion and also to allow for controlled and timely release of the therapeutic agent to a desired region of the ocular region, such as the retina. In particular disclosed embodiments, the polymer-based implant can be used for safe and effective gene therapy.

17 Claims, 9 Drawing Sheets

(56) References Cited

OTHER PUBLICATIONS

International Search Report and Written Opinion issued for International Application No. PCT/US2020/032496 on Aug. 14, 2020.
Park et al., *Biodegradable Hydrogels for Drug Delivery*, "Chapter 1.2: Hydrogels," pp. 2-3, CRC Press, published May 17, 1993.
Extended European Search Report issued for EPC application No. 20805945.1 on Jun. 9, 2022.
Examination Report issued in European Patent Application No. 20805941.1, dated Nov. 25, 2024, 5 pages.
Examination Report issued for Canada Application No. 3,139,852, mailed Mar. 5, 2025, 6 pages.
Supplementary European Search Report issued in European Patent Application No. 22896379, dated Jun. 18, 2025, 16 pages.

\* cited by examiner

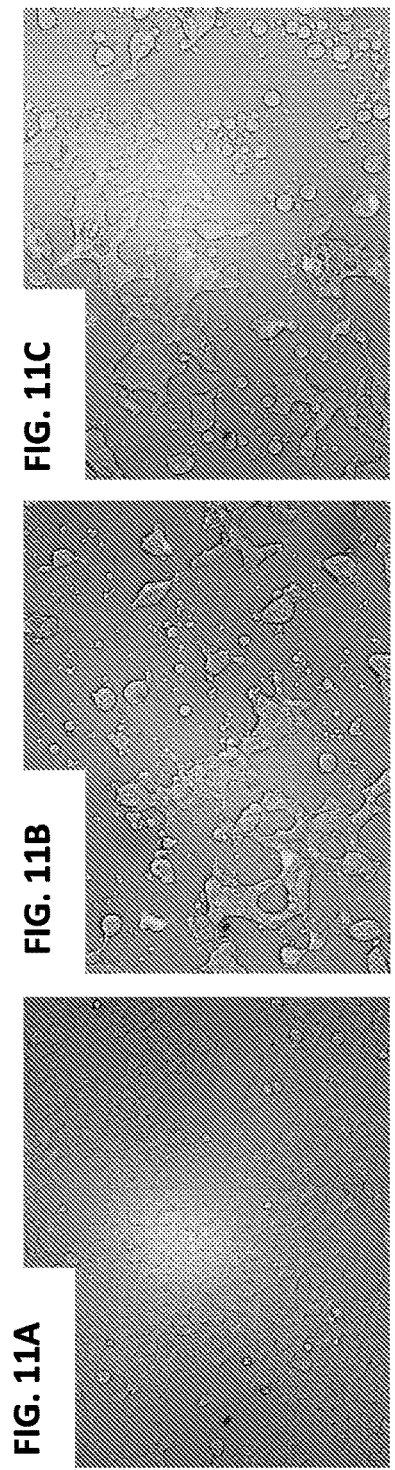
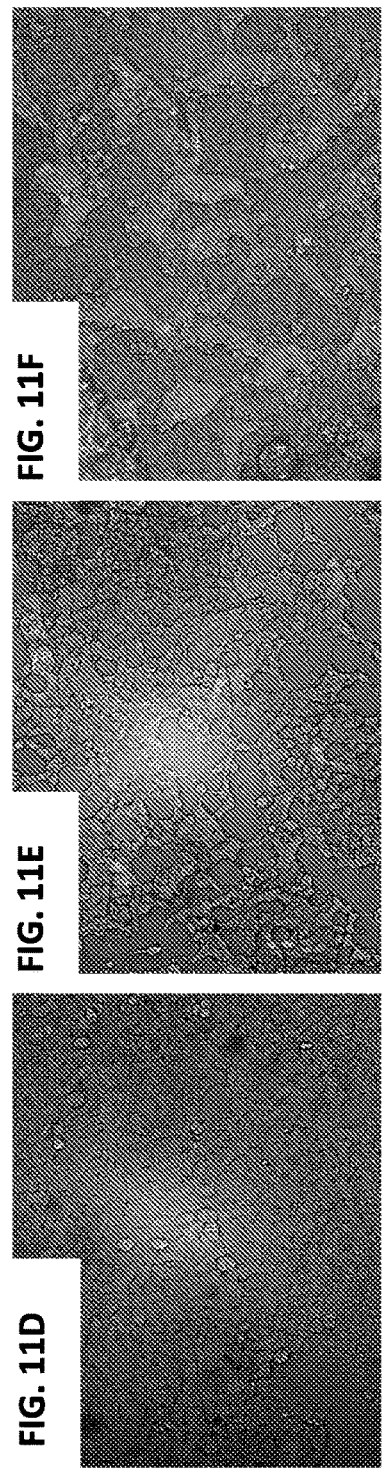
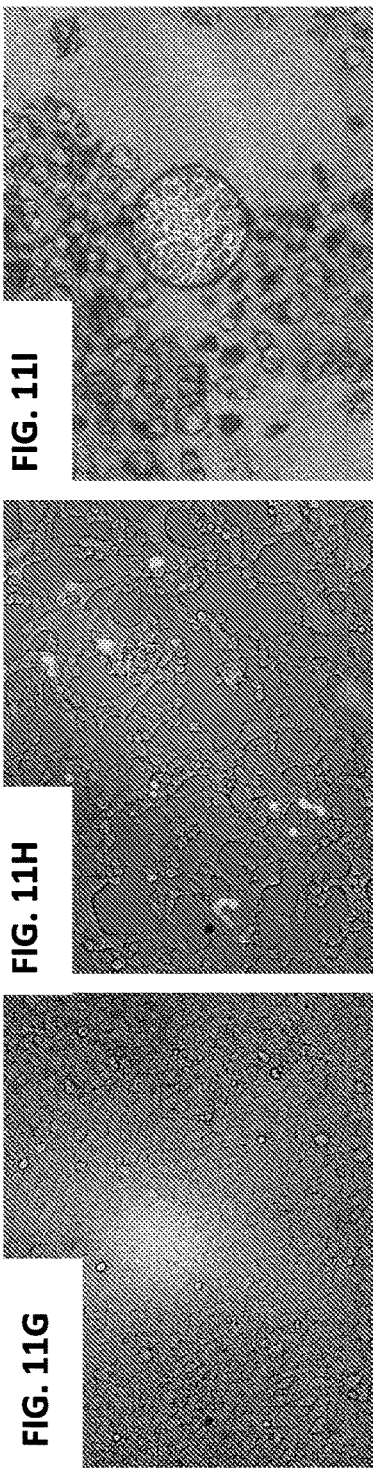

POLYMER-BASED IMPLANT FOR RETINAL THERAPY AND METHODS OF MAKING AND USING THE SAME

CROSS REFERENCE TO RELATED APPLICATION

This application is the U.S. National Stage of International Application No. PCT/US2020/032496, which was published in English under PCT Article 21(2), which in turn claims the benefit of the earlier filing date of U.S. Provisional Patent Application No. 62/846,966, filed on May 13, 2019, the entirety of which is incorporated herein by reference.

FIELD

Disclosed herein are embodiments of an implant for retinal therapy and methods of making and using the same.

BACKGROUND

The retina is the light-sensitive layer of tissue that lines the inside of the eye and communicates with the brain through the optic nerve. Several diseases involving the retina have been discovered and require treatment. Additionally, retinal degenerations/retinopathies are common and thus treatments preventing and/or reducing the extent of such degenerations/retinopathies are needed. Retinal gene therapy typically is administered by one of two routes: subretinal or intravitreal. Subretinal injections have the advantage of lower doses leading to lower immunogenicity and a high rate of infection due to the localization near the target cells; however, the area that can be accessed is extremely limited and this technique is quite invasive. There can be damage to the fovea and potential reflux into the vitreous cavity, leading to lack of control over the administered dose. Intravitreal injection, while noninvasive and capable of accessing a large area, requires a high dose that can lead to high immunogenicity. A lower % of cells are targeted through this route and reflux out of the eye is common. As such, there is a need in the art for more effective treatments for retinal disease and/or retinopathies and means for administering such treatments.

SUMMARY

Disclosed herein are embodiments of a polymer-based implant. In some embodiments, the polymer-based implant can comprise a polymer component and a therapeutic agent. In some embodiments, the polymer component comprises one or more polymer species units, wherein the polymer component is capable of absorbing water such that the polymer component transitions from a gel phase to a liquid phase as a concentration of the polymer component in the polymer-based implant decreases. In some embodiments, the therapeutic agent is suspended in the polymer component. In particular disclosed embodiments, the polymer-based implant is a solid at ambient temperature and is substantially water-free.

Also disclosed herein are embodiments of a method, comprising providing a polymer-based implant of the present disclosure and implanting the polymer-based implant into an ocular region of a subject. In some embodiments, implanting is performed via injection, such as an intravitreal injection, a subretinal injection, or a combination thereof.

Also disclosed herein are embodiments of a method, comprising treating a retinal disease and/or a retinopathy by implanting the polymer-based implant according to any one or more of the above embodiments in an ocular region of a subject having, or capable of developing, the retinal disease and/or retinopathy.

Also disclosed herein are embodiments of a method of making the polymer-based implant according to any one or more of the above embodiments, comprising: combining the polymer component and the therapeutic agent to provide a therapeutic agent-containing polymer matrix; and lyophilizing the therapeutic agent-containing polymer matrix to provide the solid polymer-based implant.

The foregoing and other objects and features of the present disclosure will become more apparent from the following detailed description, which proceeds with reference to the accompanying figures.

BRIEF DESCRIPTION OF THE DRAWINGS

FIGS. 11A-11I are images showing AAV delivery from the gel-phase of a polymer-based implant to cells vs. untreated cells (FIGS. 11A, 11D, and 11G) wherein, for all samples with AAV, titer was approximately 2.73×10$^{12}$; FIGS. 11B, 11E, and 11H show results for an embodiment comprising 100 uL gel+AAV at 1, 2, and 3 days, respectively and FIGS. 11C, 11F, and 11I show results for the same respective time points using 500 uL gel+AAV.

FIGS. 13A-13E are photographic images of a dual layered implant embodiment illustrating that FITC diffusion occurs primarily in one direction, wherein FIG. 13A shows the implant; FIG. 13B shows the implant after 1 minute; FIGS. 13C and 13D show the implant after 5 minutes; and FIG. 13E shows the implant after 15 minutes.

FIGS. 14A-14E are photographic images of a representative implant as used in vivo in a primate retina, wherein FIG. 14A shows that the implant adheres to ex vivo primate retina and transitions to a gel over 15 minutes; FIG. 14B shows the implant in vivo in a primate retina; FIG. 14C shows that the retinas were healthy even after implantation and no adverse immune response or toxicity was observed; and FIGS. 14D and 14E show GFP expression in the fovea, which confirms that the AAV was successfully encapsulated, released, and directed to the macula.

DETAILED DESCRIPTION

Overview of Terms

Figure 1:
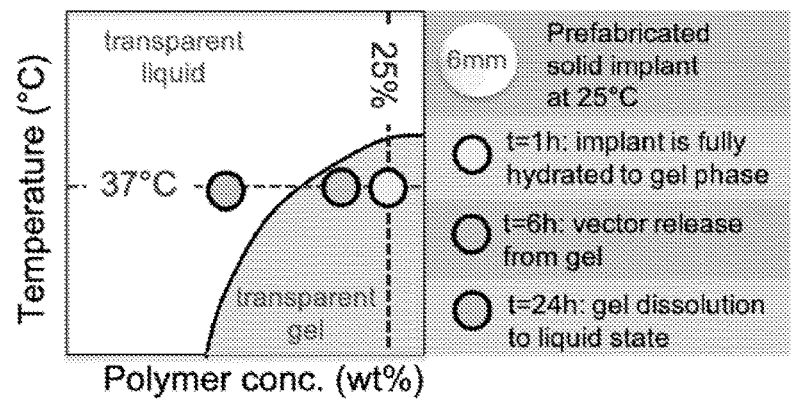
FIG. 1 is a phase diagram showing the different phases in which a representative polymer-based implant can exist as a function of temperature and polymer concentration (wt %) and includes a summary of the progression of the different phases in which the polymer-based implant can exist at different time periods.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment and may be applied to any embodiment disclosed.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided. Certain functional group terms include a symbol "-" which is used to show how the defined functional group attaches to, or within, the compound to which it is bound. A person of ordinary skill in the art would recognize that the definitions provided below and the compounds and formulas included herein are not intended to include impermissible substitution patterns (e.g., methyl substituted with 5 different groups, and the like). Such impermissible substitution patterns are easily recognized by a person of ordinary skill in the art. In formulas and compounds disclosed herein, a hydrogen atom is present and completes any formal valency requirements (but may not necessarily be illustrated) wherever a functional group or other atom is not illustrated. For example, a phenyl ring that is drawn as

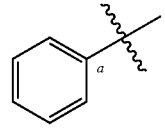 [SMILES: *c1ccccc1]

comprises a hydrogen atom attached to each carbon atom of the phenyl ring other than the "a" carbon, even though such hydrogen atoms are not illustrated. Any functional group disclosed herein and/or defined above can be substituted or unsubstituted, unless otherwise indicated herein.

Adeno-associated Virus (AAV): AAV is a small virus that infects humans and some other primate species. AAV is not currently known to cause disease and consequently the virus causes a very mild immune response. AAV can infect both dividing and non-dividing cells and may incorporate its genome into that of the host cell. The AAV genome is built of single-stranded deoxyribonucleic acid (ssDNA), either positive- or negative-sensed, which is about 4.7 kilobase long. The genome comprises inverted terminal repeats (ITRs) at both ends of the DNA strand, and two open reading frames (ORFs): rep and cap. Rep is composed of four overlapping genes encoding Rep proteins required for the AAV life cycle, and Cap contains overlapping nucleotide sequences of capsid proteins: VP1, VP2 and VP3, which interact together to form a capsid of an icosahedral symmetry. For gene therapy, ITRs seem to be the only sequences required in cis next to the therapeutic gene: structural (cap) and packaging (rep) genes can be delivered in trans.

Age-related macular degeneration (AMD): A condition in which the cells of the macula (the central part of the retina) degenerate, resulting in loss of central visual acuity. AMD is the most common cause of irreversible loss of central vision and legal blindness in the elderly. It causes progressive damage to the macula, resulting in gradual loss of central vision. There are two forms, atrophic and neovascular macular degeneration. In atrophic degeneration (dry form), the tissues of the macula thin as photoreceptor cells disappear. There is currently no treatment for atrophic degeneration, though dietary supplements may help slow progression. In neovascular macular degeneration (wet form), abnormal blood vessels develop under the macula. These vessels may leak fluid and blood under the retina and eventually a mound of scar tissue develops under the retina. Central vision becomes washed out and loses detail, and straight lines may appear wavy. For neovascular macular degeneration there are some treatments available, including the use of medication injected directly into the eye (e.g., anti-VEGF therapy), laser therapy in combination with a targeting drug (e.g., photodynamic therapy) and brachytherapy. However, repeated treatments can cause complications leading to loss of vision.

Aliphatic: A hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well. Cyclic aliphatic groups comprising alkenes are distinct from aromatic groups.

Alkenyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cycloalkenyl), cis, or trans (e.g., E or Z). Cyclic alkenyl groups are distinct from aromatic groups.

Alkyl: A saturated monovalent hydrocarbon having at least one carbon atom to 50 carbon atoms ($C_{1-50}$), such as one to 25 carbon atoms ($C_{1-25}$), or one to ten carbon atoms ($C_{1-10}$), wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Alkynyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system. For example,

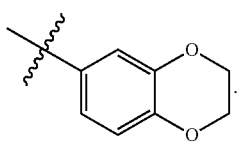 [SMILES: *c1ccc2c(c1)OCCO2]

However, in certain examples, context or express disclosure may indicate that the point of attachment is through a non-aromatic portion of the condensed ring system. For example,

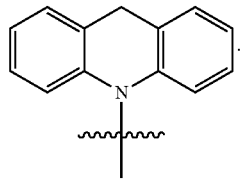 [SMILES: *N1c2ccccc2Cc2ccccc21]

An aromatic group or moiety may comprise only carbon atoms in the ring, such as in an aryl group or moiety, or it may comprise one or more ring carbon atoms and one or more ring heteroatoms comprising a lone pair of electrons (e.g., S, O, N, P, or Si), such as in a heteroaryl group or moiety. Aromatic groups may be substituted with one or more groups other than hydrogen, such as aliphatic, heteroaliphatic, haloaliphatic, haloheteroaliphatic, aromatic, or an organic functional group.

Aryl: An aromatic carbocyclic group comprising at least five carbon atoms to 15 carbon atoms ($C_5$-$C_{15}$), such as five to ten carbon atoms ($C_5$-$C_{10}$), having a single ring or multiple condensed rings, which condensed rings can or may not be aromatic provided that the point of attachment to a remaining position of the compounds disclosed herein is through an atom of the aromatic carbocyclic group. Aryl groups may be substituted with one or more groups other than hydrogen, such as aliphatic, heteroaliphatic, haloaliphatic, haloheteroaliphatic, aromatic, or an organic functional group.

Autoimmune retinopathy: Damage to the retina caused by autoantibodies to retinal proteins, which causes sudden and progressive loss of vision, leading to blindness. Autoimmune retinopathies include cancer-associated retinopathy (CAR), melanoma-associated retinopathy (MAR), autoimmune retinopathy (AR), and acute zonal occult outer retinopathy (AZOOR). Retinal proteins associated with autoimmune retinopathy include recoverin, carbonic anhydrase II, transducin-α, α-enolase, arrestin, aldolase, glyceraldehyde 3-phosphate dehydrogenase (GAPDH), tubby-like protein 1 (TULP1), heat shock protein 70, and photoreceptor cell-specific nuclear receptor.

Carbonyl: —C(O)—.

Clustered regularly interspaced short palindromic repeats (CRISPR) associated protein 9 (Cas9): An RNA-guided DNA endonuclease enzyme associated with the CRISPR (Clustered Regularly Interspersed Palindromic Repeats) adaptive immunity system in *Streptococcus pyogenes*, among other bacteria. Cas9 can cleave nearly any sequence complementary to the guide RNA. Includes Cas9 nucleic acid molecules and proteins. Cas9 sequences are publically available, for example from the GENBANK® sequence database (e.g., Accession Nos. NP_269215.1 and AKS40378.1 provide exemplary Cas9 protein sequences, while Accession No. NC_002737.2 provides an exemplary Cas9 nucleic acid sequence therein). One of ordinary skill in the art can identify additional Cas9 nucleic acid and protein sequences, including Cas9 variants.

Diabetic retinopathy: Damage to the retina that occurs as a complication of diabetes. Diabetic retinopathy is caused by changes in the blood vessels of the retina. There are four stages: 1) mild nonproliferative retinopathy, which includes occurrence of microaneurysms; 2) moderate nonproliferative retinopathy, which includes blockage of some vessels that feed the retina; 3) severe nonproliferative retinopathy, which includes more severe vessel blockage; and 4) proliferative retinopathy, which includes growth of abnormal blood vessels on the retina and the vitreous. Damage to the retina and/or vision loss occurs when these vessel leak or hemorrhage. Macular edema may also occur, particularly during the nonproliferative stages of the condition. Diabetic retinopathy is considered a subset of vascular retinopathy.

Haloaliphatic: An aliphatic group wherein one or more hydrogen atoms, such as one to 10 hydrogen atoms, independently is replaced with a halogen atom, such as fluoro, bromo, chloro, or iodo.

Heteroaliphatic: An aliphatic group comprising at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group. Alkoxy, ether, amino, disulfide, peroxy, and thioether groups are exemplary (but non-limiting) examples of heteroaliphatic.

Implanting (or Implantation): Inserting a polymer-based implant within an ocular region. The polymer-based implant does not need to be fixed in a position to be implanted, but in some embodiments it can become fixed via mucoadhesion.

Leber congenital amaurosis (LCA): A rare inherited eye disease that appears at birth or in the first few months of life and primarily affects the retina. The presentation can vary because is it associated with multiple genes. However, it is characterized by characterized by nystagmus, photophobia, sluggish or absent pupillary response, and severe vision loss or blindness. The pupils, which usually expand and contract in response to the amount of light entering the eye, do not react normally to light. Instead, they expand and contract more slowly than normal, or they may not respond to light at all. Additionally, the clear front covering of the eye (the cornea) may be cone-shaped and abnormally thin, a condition known as keratoconus. A specific behavior called Franceschetti's oculo-digital sign is characteristic of Leber congenital amaurosis. This sign consists of poking, pressing, and rubbing the eyes with a knuckle or finger.

Ocular region: Any area of the eye, including the anterior and posterior segment of the eye, and which generally includes, but is not limited to, any functional (e.g., for vision) or structural tissues found in the eyeball, or tissues or cellular layers that partly or completely line the interior or exterior of the eyeball. Ocular regions include the anterior chamber, the posterior chamber, the vitreous cavity, the choroid, the suprachoroidal space, the subretinal space, the conjunctiva, the subconjunctival space, the episcleral space, the intracorneal space, the epicorneal space, the sclera, the pars plana, surgically-induced avascular regions, the macula, and the retina.

Organic Functional Group: A functional group that may be provided by any combination of aliphatic, heteroaliphatic, aromatic, and/or haloaliphatic groups, or that may be selected from, but not limited to, aldehyde (i.e., —C(O)H); aroxy (i.e., —O-aromatic); acyl halide (i.e., —C(O)X, wherein X is a halogen, such as Br, F, I, or Cl); halogen; nitro (i.e., —NO$_2$); cyano (i.e., —CN); azide (i.e., —N$_3$); carboxyl (i.e., —C(O)OH); carboxylate (i.e., —C(O)O— or salts thereof, wherein the negative charge of the carboxylate group may be balanced with an M$^+$ counterion, wherein M$^+$ may be an alkali ion, such as K$^+$, Na$^+$, Li$^+$; an ammonium ion, such as $^+$N(R$^b$)$_4$ where R$^b$ is H, aliphatic, heteroaliphatic, haloaliphatic, or aromatic; or an alkaline earth ion, such as [Ca$^{2+}$]$_{0.5}$, [Mg$^{2+}$]$_{0.5}$, or [Ba$^{2+}$]$_{0.5}$); amide (i.e., —C(O)NR$^a$R$^b$ or —NR$^a$C(O)R$^b$ wherein each of R$^a$ and R$^b$ independently is selected from hydrogen, aliphatic, heteroaliphatic, haloaliphatic, aromatic, or an organic functional group); ketone (i.e., —C(O)R$^a$, wherein R$^a$ is selected from aliphatic, heteroaliphatic, haloaliphatic, aromatic, or an organic functional group); carbonate (i.e., —OC(O)OR$^a$, wherein R$^a$ is selected from aliphatic, heteroaliphatic, haloaliphatic, aromatic, or an organic functional group); imine (i.e., —C(=NR$^a$)R$^b$ or —N=CR$^a$R$^b$, wherein R$^a$ and R$^b$ independently is selected from hydrogen, aliphatic, heteroaliphatic, haloaliphatic, aromatic, or an organic functional group); azo (i.e., —N=NR$^a$ wherein R$^a$ is hydrogen, aliphatic, heteroaliphatic, haloaliphatic, aromatic, or an organic functional group); carbamate (i.e., —OC(O)NR$^a$R$^b$, wherein each of R$^a$ and R$^b$ independently is selected from hydrogen, aliphatic, heteroaliphatic, haloaliphatic, aromatic, or an organic functional group); hydroxyl (i.e., —OH); thiol (i.e., —SH); sulfonyl (i.e., —SO$_2$R$^a$, wherein R$^a$ is selected from hydrogen, aliphatic, heteroaliphatic, haloaliphatic, aromatic, or an organic functional group); sulfonate (i.e., —SO$_3$, wherein the negative charge of the sulfonate group may be balanced with an M$^+$ counter ion, wherein M$^+$ may be an alkali ion, such as K$^+$, Na$^+$, Li$^+$; an ammonium ion, such as $^+$N(R$^b$)$_4$ where R$^b$ is H, aliphatic, heteroaliphatic, haloaliphatic, or aromatic; or an alkaline earth ion, such as [Ca$^{2+}$]$_{0.5}$, [Mg$^{2+}$]$_{0.5}$, or [Ba$^{2+}$]$_{0.5}$); oxime (i.e., —CR$^a$=NOH, wherein R$^a$ is hydrogen, aliphatic, heteroaliphatic, haloaliphatic, aromatic, or an organic functional group); sulfonamide (i.e., —SO$_2$NR$^a$R$^b$ or —N(R$^a$)SO$_2$R$^b$, wherein each of R$^a$ and R$^b$ independently is selected from hydrogen, aliphatic, heteroaliphatic, haloaliphatic, aromatic, or an organic functional group); ester (i.e., —C(O)OR$^a$ or —OC(O)R$^a$, wherein R$^a$ is selected from aliphatic, heteroaliphatic, haloaliphatic, aromatic, or an organic functional group); thiocyanate (i.e., —S—CN or —N=C=S); thioketone (i.e., —C(S)R$^a$ wherein R$^a$ is selected from hydrogen, aliphatic, heteroaliphatic, haloaliphatic, aromatic, or an organic functional group); thiocarboxylic acid (i.e., —C(O)SH, or —C(S)OH); thioester (i.e., —C(O)SR$^a$ or —C(S)OR$^a$ wherein R$^a$ is selected from hydrogen, aliphatic, heteroaliphatic, haloaliphatic, aromatic, or an organic functional group); dithiocarboxylic acid or ester (i.e., —C(S)SR$^a$ wherein R$^a$ is selected from hydrogen, aliphatic, heteroaliphatic, haloaliphatic, aromatic, or an organic functional group); phosphonate (i.e., —P(O)(OR$^a$)$_2$, wherein each R$^a$ independently is hydrogen, aliphatic, heteroaliphatic, haloaliphatic, aromatic, or an organic functional group; or wherein one or more R$^a$ groups are not present and the phosphate group therefore has at least one negative charge, which can be balanced by a counterion, M$^+$, wherein each M$^+$ independently can be an alkali ion, such as K$^+$, Na$^+$, Li$^+$; an ammonium ion, such as $^+$N(R$^b$)$_4$ where R$^b$ is H, aliphatic, heteroaliphatic, haloaliphatic, or aromatic; or an alkaline earth ion, such as [Ca$^{2+}$]$_{0.5}$, [Mg$^{2+}$]$_{0.5}$, or [Ba$^{2+}$]$_{0.5}$); phosphate (i.e., —O—P(O)(OR$^a$)$_2$, wherein each R$^a$ independently is hydrogen, aliphatic, heteroaliphatic, haloaliphatic, aromatic, or an organic functional group; or wherein one or more R$^a$ groups are not present and the phosphate group therefore has at least one negative charge, which can be balanced by a counterion, M$^+$, wherein each M$^+$ independently can be an alkali ion, such as K$^+$, Na$^+$, Li$^+$; an ammonium ion, such as $^+$N(R$^b$)$_4$ where R$^b$ is H, aliphatic, heteroaliphatic, haloaliphatic, or aromatic; or an alkaline earth ion, such as [Ca$^{2+}$]$_{0.5}$, [Mg$^{2+}$]$_{0.5}$, or [Ba$^{2+}$]$_{0.5}$); silyl ether (i.e., —OSiR$^a$R$^b$, wherein each of R$^a$ and R$^b$ independently is selected from hydrogen, aliphatic, heteroaliphatic, haloaliphatic, aromatic, or an organic functional group); sulfinyl (i.e., —S(O)R$^a$, wherein R$^a$ is selected from hydrogen, aliphatic, heteroaliphatic, haloaliphatic, aromatic, or an organic functional group); thial (i.e., —C(S)H); or combinations thereof.

Pharmaceutically acceptable excipient: A substance, other than the therapeutic agent, that is included in a polymer-based implant. As used herein, an excipient typically is physically mixed with the polymer component and/or therapeutic agent of the polymer-based implant. An excipient can be used, for example, to dilute a therapeutic agent and/or to modify properties the polymer component and/or therapeutic agent of the polymer-based implant. Excipients can include, but are not limited to, antiadherents, binders, coatings, enteric coatings, disintegrants, flavorings, sweeteners, colorants, lubricants, glidants, sorbents, preservatives, carriers or vehicles. Excipients may be starches and modified starches, cellulose and cellulose derivatives, saccharides and their derivatives such as disaccharides, polysaccharides and sugar alcohols, protein, synthetic polymers, crosslinked polymers, antioxidants, amino acids or preservatives. Exemplary excipients include, but are not limited to, magnesium stearate, stearic acid, vegetable stearin, sucrose, lactose, starches, hydroxypropyl cellulose, hydroxypropyl methylcellulose, xylitol, sorbitol, maltitol, gelatin, polyvinylpyrrolidone (PVP), polyethyleneglycol (PEG), tocopheryl polyethylene glycol 1000 succinate (also known as vitamin E TPGS, or TPGS), carboxy methyl cellulose, dipalmitoyl phosphatidyl choline (DPPC), vitamin A, vitamin E, vitamin C, retinyl palmitate, selenium, cysteine, methionine, citric acid, sodium citrate, methyl paraben, propyl paraben, sugar, silica, talc, magnesium carbonate, sodium starch glycolate, tartrazine, aspartame, benzalkonium chloride, sesame oil, propyl gallate, sodium metabisulphite or lanolin.

Retinal degeneration: Deterioration of the retina, including progressive death of the photoreceptor cells of the retina or associated structures (such as retinal pigment epithelium). Retinal degeneration includes diseases or conditions such as retinitis pigmentosa, cone-rod dystrophy, macular degeneration (such as age-related macular degeneration and Stargardt-like macular degeneration), and maculopathies.

Retinal ganglion cell (RGC): A neuron located in the ganglion cell layer of the retina. RGCs receive neural inputs from amacrine cells and/or bipolar cells (which themselves receive neural input from photoreceptor cells). The axons of RGCs form the optic nerve, which transmits information from the retina to the brain.

Retinal responsiveness to light: The ability of one or more cells of the retina to respond to light, for example by producing an electrical signal and/or perception of a visual stimulus by a subject. Retinal response to light can be measured by detecting number, size, and/or frequency of electrical signals from the retina, for example by direct retinal recording (in vitro or in vivo), electroretinogram, or measuring visual evoked responses. Retinal response to light can also be measured by reporting of detection of a visual stimulus by a subject, for example wherein the subject closes a switch or presses a button when a visual stimulus is seen.

Retinitis pigmentosa (RP): A group of inherited retinal disorders that eventually lead to partial or complete blindness, characterized by progressive loss of photoreceptor cell function. Symptoms of RP include progressive peripheral vision loss and night vision problems (nyctalopia) that can eventually lead to central vision loss. RP is caused by mutations is over 100 different genes, and is both genotypically and phenotypically heterogeneous. Approximately 30% of RP cases are caused by a mutation in the rhodopsin gene. The pathophysiology of RP predominantly includes cell death of rod photoreceptors; however, some forms affect cone photoreceptors or the retinal pigment epithelium (RPE). Typical clinical manifestations include bone spicules, optic nerve waxy pallor, atrophy of the RPE in the mid periphery of the retina, retinal arteriolar attenuation, bull's eye maculopathy, and peripheral retinal atrophy.

Subject: Human and non-human subjects, including avian species and non-human mammals, such as non-human primates, companion animals (such as dogs and cats), livestock (such as ungulates and/or ruminants), as well as non-domesticated animals, such as the big cats.

Therapeutically Effective Amount: A quantity of a specified therapeutic agent sufficient to achieve a desired effect in a subject being treated with that therapeutic agent. Ideally, a therapeutically effective amount of an agent is an amount sufficient to inhibit or treat the disease or condition without causing a substantial cytotoxic effect in the subject. The therapeutically effective amount of an agent will be dependent on the subject being treated, the severity of the affliction, and the manner of administration of the therapeutic composition. For example, a "therapeutically effective amount" may be a level or amount of agent needed to treat a retinal disease and/or retinopathy, or reduce or prevent retinal disease and/or retinopathy without causing significant negative or adverse side effects to the eye or a region of the eye.

Vector: A nucleic acid molecule as introduced into a host cell, thereby producing a transformed host cell. A vector may include nucleic acid sequences that permit it to replicate in the host cell, such as an origin of replication. A vector may also include one or more therapeutic genes and/or selectable marker genes and other genetic elements known in the art. A vector can transduce, transform or infect a cell, thereby causing the cell to express nucleic acids and/or proteins other than those native to the cell. A vector optionally includes materials to aid in achieving entry of the nucleic acid into the cell, such as a viral particle, liposome, protein coating or the like.

Virus: Microscopic infectious organism that reproduces inside living cells. A virus consists essentially of a core of a single nucleic acid surrounded by a protein coat and has the ability to replicate only inside a living cell. "Viral replication" is the production of additional virus by the occurrence of at least one viral life cycle. Viral vectors are known in the art, and include, for example, adenovirus, AAV, lentivirus and herpes virus.

Introduction

Until recently, there have been no effective treatments for retinal diseases and/or retinopathies. While certain gene therapies for retinal dystrophy have been developed, there is a significant need to develop new approaches for others forms of retinal degeneration. Also, the surgical approach used for certain treatments often are suboptimal in retinas with more significant structural alterations. As such, there is a need in the art for alternative treatments that can be adapted to various different administration techniques used for ocular treatment and that exhibit flexibility in terms of the particular cells to be targeted and/or the particular retina structure of a subject.

Disclosed herein are polymer-based implant embodiments that can be used to improve clinical outcomes and to extend the application of gene therapies to numerous retinopathies at various stages of disease. The disclosed polymer-based implant embodiments are able to target specific cell types, treat the macular area without damaging the remaining photoreceptors (a potential concern with subretinal injections in conditions where the retina is structurally compromised), exhibit efficient panretinal gene expression, and/or limit the inflammatory/immune responses associated with intravitreal injections.

Polymer-based implant embodiments of the present disclosure exhibit good biocompatibility, particularly with the retina, and do not produce degradation products when in use. Biocompatibility of a material used for retinal therapy has been a short-coming of treatments developed in the field prior to the present disclosure. Polymeric materials that may have been used in the art, which are safe for use in some parts of the eye, can be unsafe when used on or near the retina, which can be due at least in part to the buildup of degradation byproducts as the material undergoes successive biochemical cleavage of polymer chains (typically via hydrolysis) and dissolution of the resulting oligomeric or monomeric units.

Materials used in the art for intravitreally administered gene therapy also have exhibited a lack of control over vector localization. For example, controlled, consistent placement of nano- or microscale systems (such as solid particles, liposomes, and dendrimers) is difficult as these materials typically are distributed throughout the vitreous. And, hydrogels and other non-particulate delivery methods tend to sink rather than diffuse. Diffuse materials in the vitreous also are subjected to higher rates of inactivation, particularly inactivation by neutralizing antibodies. The polymer-based implant embodiments of the present disclosure are able to avoid the high rates of inactivation than other treatments that administer therapeutics/vectors by diffusing them through the vitreous.

Other drawbacks associated with existing particulate and non-particulate systems that are administered intravitreally include the requirement that the amount injected must be well above the desired virus titer in order to ensure sufficient retinal delivery and/or reflux of the injected solution is common and can lead to additional inconsistencies with the administered dose. In contrast, the polymer-based implant embodiments described herein can be pre-loaded with a therapeutic agent prior to administering the polymer-based implant, thereby providing a known and controllable amount of the therapeutic agent. In embodiments where the therapeutic agent is a vector, the polymer-based implant can be designed to contain a known titer of virus homogeneously distributed within polymer-based implant material on a per mass basis.

In some embodiments, the polymer-based implant can be used to deliver high efficiency vectors, such as adeno-associated virus (AAV) vectors, directly to the retina from the vitreous. Precise dosages of therapeutics and/or vectors can be administered using the disclosed polymer-based implant embodiments and the polymer-based implant can be directed to specific retinal locations and/or can be custom-engineered to have a shape that matches a particular retinal structure and/or geographic atrophy region of a subject. The disclosed polymer-based implant embodiments and methods of using the same provide the ability to target photoreceptors and RPE cells, which are the two main cell types involved in retinal degeneration. The polymer-based implant embodiments also can be used in combination with other retinal degeneration therapy, such as optogenetic therapy, gene transfer of rod-derived cone viability factor, CRISPR-Cas9 therapy, and the like.

Polymer-Based Implant Embodiments

Disclosed herein are embodiments of a polymer-based implant for use in treating retinal diseases and/or retinopathies. In particular disclosed embodiments, the polymer-based implant comprises a polymer component and a therapeutic agent. Each of these components of the polymer-based implant are described in more detail below.

The polymer component typically comprises one or more polymer unit species, wherein each polymer unit species can be the same or different as any other polymer unit species included in the polymer component. In some embodiments, the polymer component comprises a single polymer unit species. In some embodiments, the polymer component is a co-polymer, which comprises two polymer unit species that typically are structurally distinct from one another. In yet some other embodiments, the polymer component is a tri-block co-polymer, which can comprise three different polymer unit species or two different polymer species. In some embodiments, the polymer component comprises a polymer species unit that is bound to two end-capping groups. In such embodiments, the polymer component can have a formula A-B-A, wherein each A component independently is an end-capping group and the B component is a polymer unit species. In some embodiments, both A components of the A-B-A triblock co-polymer are identical and in other embodiments the A components can be different (either in terms of structural identity, molecular weight, or the like). Representative classes and species of compounds that can be used as the polymer unit species of the polymer component are described below, as well as representative classes and species of end-capping groups.

In particular disclosed embodiments, the polymer component is a biocompatible bioerodible polymer. In yet additional embodiments, the polymer component is optically transparent or becomes optically transparent within a short time period after being implanted in an ocular region. The polymer component can include crosslinks among various polymer species units in the polymer and thus can form a crosslinked matrix. In particular embodiments, the polymer component is capable of undergoing different phase transitions upon hydration in an aqueous environment, such as the vitreous of the eye. Solely by way of example, the polymer component can transition from (i) a solid phase to (ii) a gel phase to (iii) a liquid phase over a certain time period after being exposed to an aqueous environment. In some embodiments, the therapeutic agent is released when the polymer component transitions to the gel phase and complete release occurs before the polymer component transitions to the liquid phase. In particular disclosed embodiments, the therapeutic agent can be released as the concentration of the polymer component reaches 25 wt %.

In some embodiments, the polymer unit species can be selected from hydrocarbon polymers, heteroaliphatic polymers, carbonyl-containing polymers, haloaliphatic polymers, and saccharide-based polymers.

Representative hydrocarbon polymers can include, but are not limited to, polyalkylenes, such as polyethylene, polypropylene, polystyrene, or combinations thereof.

Representative heteroaliphatic polymers can include, but are not limited to, polyalkylene glycols, poloxamines, polyalkylene oxides, polyvinyl alcohols, polyvinyl ethers, polysiloxanes, polyvinyl esters, polyvinylpyrrolidone, poly(vinyl acetate), or any combinations thereof. In some embodiments, the heteroaliphatic polymer can be a polyethylene glycol polymer (PEG), or a polypropylene glycol polymer (PPG).

Representative haloaliphatic polymers can include, but are not limited to, polyvinyl halides, such as polyvinyl chloride, fluorinated polyethylene polymers, fluorinated polypropylene polymers, poly vinyl chloride polystyrene or any combinations thereof.

Representative carbonyl-containing polymers can include, but are not limited to, polyamides, polycarbonates, polyesters, polyalkylene terephthalates, polyurethanes, polyglycolides, polyhydroxyacids, polyhydroxyalkanoates. Exemplary carbonyl-containing polymers can include poly (methyl methacrylate), poly(ethylmethacrylate), poly(butylmethacrylate), poly(isobutylmethacrylate), poly(caprolactone), poly(hexylmethacrylate), poly(isodecylmethacrylate), poly(lauryl methacrylate), poly(phenyl methacrylate), poly(methyl acrylate), poly(isopropyl acrylate), poly(isobutyl acrylate), poly(octadecyl acrylate), poly lactic acid, poly (lactic-co-glycolic acid), or any combinations thereof.

Representative saccharide-based polymers can include, but are not limited to, alkyl cellulose, hydroxyalkyl celluloses, cellulose ethers, cellulose esters, nitro celluloses, methyl cellulose, ethyl cellulose, hydroxypropyl cellulose, alginate, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, cellulose sulphate sodium salt, dextran, chitosan, or any combinations thereof.

Polymer component embodiments of the present disclosure also can exhibit mucoadhesive properties and thus can facilitate adhering polymer-based implant embodiments to the retina during hydration. For example, the mucoadhesive properties of the polymer component can promote adhering the polymer-based implant to glycoproteins present in the eye, particularly in the retina. In yet some additional embodiment, a polymer-based implant comprising a polymer component that does not exhibit mucoadhesive properties can be modified to comprise one or more mucoadhesive polymer additives. Exemplary mucoadhesive polymer additives can include chitosan, hyaluronic acid, and the like. In some embodiments, retinal adhesion can be evaluated using washability measurements, wherein a final mass of the polymer-based implant is compared to the initial mass of the polymer-based implant and/or by determining mucin absorption on therapeutic agent-loaded gels to simulate adsorption to the mucin-like glycoproteins on the retina.

Representative end-capping groups can include hydrocarbon compounds, such as aliphatic groups, heteroaliphatic groups, aromatic groups, or combinations thereof. In some embodiments, the end-capping groups can be acyclic $C_{1-50}$ aliphatic chains and/or acyclic $C_{1-50}$ heteroaliphatic chains, which can be branched or un-branched; cyclic $C_{3-10}$ aliphatic groups and/or cyclic $C_{1-50}$ heteroaliphatic chains; aryl groups; heteroaryl groups; or combinations thereof.

In exemplary embodiments, the polymer component comprises a PEG polymer unit that is coupled at each end to an aliphatic end-capping group and thus has a structure satisfying the formula A-B-A. In particular embodiments, the aliphatic end-capping groups are octadecyl groups and thus each A component is an octadecyl group. In particular embodiments, the PEG polymer unit species is component B and it has a molecular weight of 10,000 g/mol and is —$(OCH_2CH_2)_{226}O$—. In such embodiments, the polymer component can have a formula $C_{18}H_{37}$—$(OCH_2CH_2)_{226}O$—$C_{18}H_{37}$. Other molecular weights of the PEG group can be used to control therapeutic agent release, as discussed below.

Therapeutic agents that can be included in the polymer-based implants can be selected from vectors, such as AAV vectors (e.g., AAV1, AAV2, AAV2-4YF, AAV2-4YFTV, AAV4, AAV6, AAV8, AAV8-2YF, AAV9, AAV9-2YF, AAVrh10, AAV11, AAV12, or the like; therapeutic drugs, such as anti-angiogenics (e.g., anti-VEGF antibodies or soluble receptors), fusion proteins (e.g., aflibercept), small molecules (e.g., ganciclovir), rod-derived cone viability factor (or other growth factors/proteins), naked DNA and/or RNA, chemotherapeutics (e.g., carboplatin or other chemotherapy for retinoblastoma); naturally and/or non-naturally occurring CRISPR-Cas9 systems comprising one or more AAV vectors; optogenetic therapeutic agents, such as an optogenetic actuator (e.g., channelrhodopsin, halorhodopsin, and/or archaerhodopsin), a promoter (e.g., CAMKIIα, Thy1, or the like), or combinations thereof, or one or more vectors that contain such actuators attached to a suitable promoter; or any combinations thereof. In yet additional embodiments, the polymer-based implant can comprise an additional drug delivery vehicle, such as a micelle, a dendrimer, a carbon nanotube, a liposome, a hydrogel particle, a protein nanoparticle, a polymer nano- or microsphere or any combinations thereof (and including pluralities of any such vehicles).

In particular disclosed embodiments, the therapeutic component used in the polymer-based implant is a vector, such as an AAV vector (including recombinant AAV vectors). Particular vector embodiments are designed to infect retinal cells, photoreceptor (rod and/or cone) cells, retinal ganglion cells, RPE cells, Müller cells, retinal pigmented epithelial cells, bipolar cells, amacrine cells (including amacrine cells A and B), astrocytes, microglia, pericytes, vascular endothelium cells, horizontal cells, and other cells located in the ocular region and/or associated with the ocular region. In some embodiments, the vector can comprise a heterologous nucleic acid comprising a nucleotide sequence encoding a gene product, such as an interfering RNA (e.g., interfering RNA that decreases the level of apoptotic and/or angiogenic factors in a cell), an aptamer (e.g., aptamers active against vascular endothelial growth factor), a polypeptide (e.g., a polypeptide that enhances function of a retinal cell, such as the function of a rod or cone photoreceptor cell, a retinal ganglion cell, a bipolar cell, an amacrine cell, a Müller cell, a microglia cell, a pericyte cell, an RPE cell, a horizontal cell, a vascular endothelium cell, a retinal pigmented epithelial cell, or the like), a site-specific endonuclease (e.g., an endonuclease that provides for site-specific knock-down of gene function, such as knocking out an allele associated with a retinal disease), or any combinations thereof.

In particular embodiments of the disclosed polymer-based implant, the therapeutic agent is associated with the polymer component such that it is embedded in, dissolved in, dispersed in, adsorbed on, suspended in, or bound to the polymer component. The amount of the therapeutic agent included in the polymer-based implant can be determined based on a particular dosage that is to be achieved after implantation. In particular disclosed embodiments, a therapeutically effective amount of the therapeutic agent is provided. In some embodiments where the therapeutic agent is a vector, the dosage of the vector in the polymer-based implant is selected to match to a known titer of virus is used on a per mass basis. In some embodiments, the per mass basis of a vector loaded in a polymer-based implant embodiment can be determined by determining the total protein concentration released over time using, for example, a bicinchoninic acid assay. The result of any such protein assay provides an assessment of the maximum loading capacity of the polymer-based implant. In some embodiments, the vector can be provided in an amount that facilitates using a lowest feasible titer while still achieving efficient gene expression. Solely by way of example, the vector can be diluted to a desired multiplicity of infection (MOI) to lead to a particular percentage rate of transduction in a cell line of interest. Solely by way of example, a polymer-based implant can be prepared that comprises an AAV vector diluted to an MOI of 1500, which provides a concentration of the AAV vector that results in 50% of transduction in a cell line, such as in HEK 293 cells. In yet additional embodiments, the amount of the therapeutic agent included in the polymer-based implant can range from greater than 0 wt % to a maximum amount that can be included without deleteriously affective the phase transitions of the polymer-based implant. Factors that can be evaluated to determine suitable amounts of the therapeutic agent to include in the polymer-based implant can include osmotic pressure of the loaded therapeutic agent and the resulting viscosity of a suspension (if the therapeutic agent is a solid material) phase properties of the resulting polymer-based implant, and/or implantation/instillation capability.

The polymer component of the polymer-based implant can be modified to tune therapeutic agent release rate and/or the phase characteristics of the polymer-based implant. In some embodiments, the concentration of the polymer component included in the polymer-based implant (in terms of the resulting implant, not necessarily the initial concentration of the polymer component prior to implant formation) can be modified to influence the phase changes of the polymer-based implant, which, in some embodiments, can indirectly influence the release rate of the therapeutic agent. In some additional embodiments, the molecular weight of one or more of the polymer species units can be modified to increase or decrease the rate of therapeutic agent release. For example, the molecular weight of the one or more polymer species units can be increased so as to decrease rehydration rates of the polymer component thereby decreasing therapeutic release rate. In yet additional embodiments, the amount of crosslinking (also referred to herein as crosslinking density) can be modified to increase or decrease the rate of therapeutic agent release. For example, the crosslinking density can be decreased to increase therapeutic agent release rate. In yet additional embodiments, therapeutic agent release rate can be decreased by incorporating a second therapeutic agent into the crosslinked matrix of the polymer-based implant.

The polymer-based implant is in solid form, particularly an opaque solid, when administered and can change phase after implantation. Because the polymer-based implant is a solid when administered, it eliminates risk of vector reflux, rapid vitreal clearance, and/or inconsistent dosing. In some embodiments, the solid phase of the polymer-based implant can change to a gel-like phase and then to a liquid phase. In particular disclosed embodiments, the polymer-based implant is opaque when administered to the subject and becomes transparent once it begins to change phase to a gel-like phase and/or liquid phase.

Figure 2A:
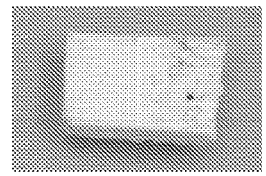
FIGS. 2A-2C are images of a dry, solid polymer-based implant (FIG. 2A), the different phases of the implant as hydration occurs over three hours (FIG. 2B), and the adhesive capabilities of the implant (FIG. 2C).
Figure 2B:
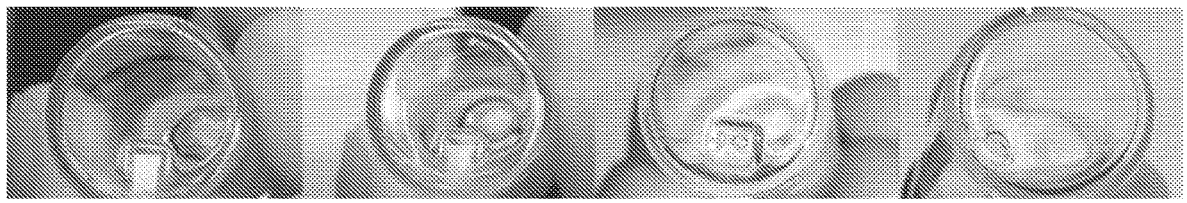
Figure 2C:
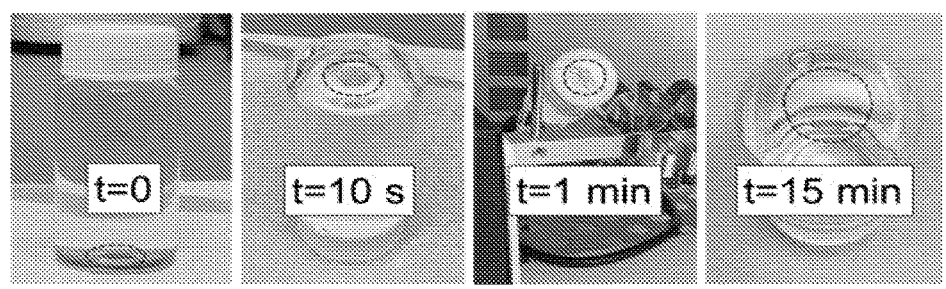
Figure 3:
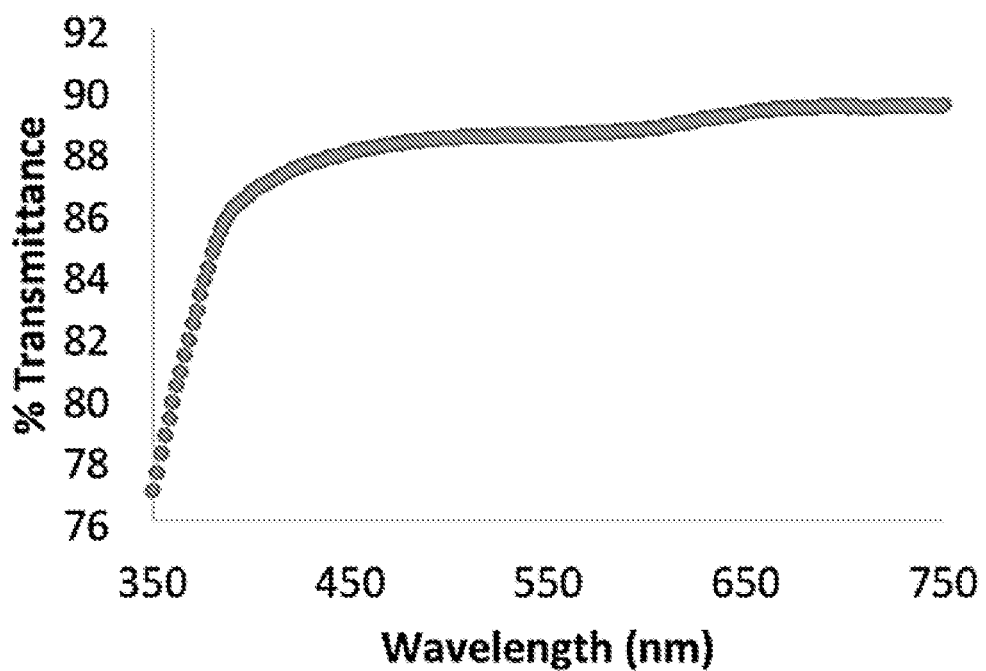
FIG. 3 is a graph of % transmittance as a function of wavelength (nm) illustrating that a representative polymer-based implant is transparent after implantation as evidenced by transmittance across 350-750 nm.

A representative phase diagram of a particular polymer-based implant of the present disclosure is illustrated in FIG. 1. With referenced to FIG. 1, the solid line represents the upper critical solution temperature (also referred to herein as "UCST"), a function of both temperature and polymer concentration (typically expressed in wt %). Below the UCST the polymer-based implant exists as a 2-phase gel and above the UCST, the polymer-based implant exists as a single-phase liquid solution. As discussed herein, the polymer-based implant can be fabricated as a 2-phase gel which then is lyophilized into a solid. Both the 2-phase gel and the single-phase liquid solution are transparent. For example, FIGS. 2A and 2B show one embodiment of a representative polymer-based implant (FIG. 2A) and its hydration over a three hour time period (which, in some embodiments, is a suitable amount of time for therapeutic agent release) (FIG. 2B). As shown in FIGS. 2A and 2B, the solid polymer-based implant transitions from an opaque solid to a viscous, transparent gel upon hydration. FIG. 2C shows a stained implant (stained for visualization purposes) and its hydration over 15 minutes to a viscous, transparent gel. As can be seen in FIG. 2C, the implant is stably retained on the glass vial surface during complete inversion (second photograph from the left) and end-over-end rotation (second photograph from the right), indicating that movement from the implantation site is negligible. The transmittance of the gel across the visible light spectrum in its final hydrated form can be seen in FIG. 3, which is substantially similar to the percent transmittance reported for human vitreous (e.g., approximately 70-80% direct transmittance across 350-750 nm), indicating that the polymer-based implant is suitable for ocular implantation. Also illustrated in FIG. 1 (shown to the right of the phase diagram) is a summary of polymer-based implant phase progression after intravitreal implantation. Because the polymer-based implant is fabricated as a 2-phase gel and lyophilized into a solid, it is initially a dehydrated solid that falls completely outside the given phase diagram. Once implanted, the polymer-based implant can begin to hydrate (and thus, from a perspective of the phase diagram, moves into the "transparent gel" region of the phase diagram) and the concentration of the polymer component begins to decrease. As such, hydration of the polymer-based implant restores it from the solid phase to the gel phase (which is substantially similar to the consistency of the vitreous humor of an eye). Hydration of the polymer-based implant can thus affect polymer component concentration, which thereby controls vector release because, as water infiltrates the matrix of the polymer component, this allows for diffusion of therapeutic agent out of the polymer-based implant. During this therapeutic agent release phase, the polymer-based implant typically remains the gel phase, resulting in a higher level of control over the rate of vector release throughout an initial post-implantation period (e.g., a 6-hour post-implantation period). At after this post-implantation period (typically 24 hours or more), the gel phase of the polymer component absorbs enough water to effectively reduce the polymer concentration such that the polymer component can shift to the liquid phase. This final form of the polymer component is transparent, biocompatible, and stable. In particular disclosed embodiments, the liquid form of the polymer component does not degrade and thus does not have to be affirmatively removed and also does not result in any toxicity within the ocular region.

Figure 4:
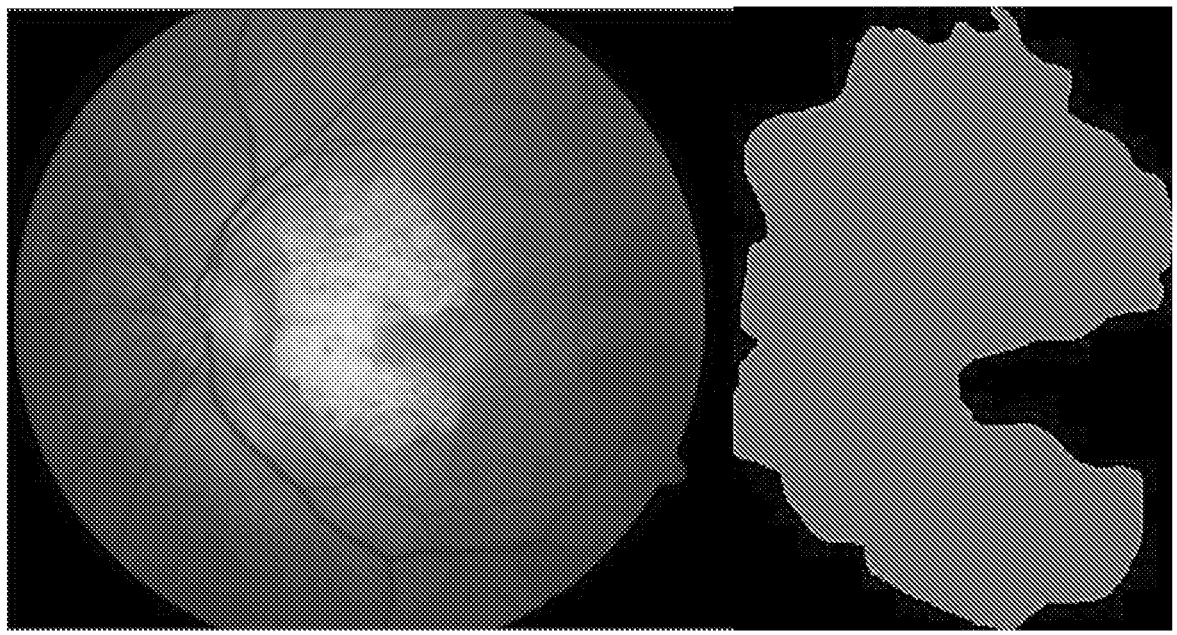
FIG. 4 is a fundus photographic image of an eye comprising a geographic atrophy region (left) and a 3-D printed mold (right) that can be used to make a polymer-based implant having a geometry matching the atrophy region.

In some embodiments, because the polymer-based implant is in a solid form when administered, it can be provided in any geometry and/or size. This tunability with respect to the shape and size of the polymer-based implant facilitates the ability to match the shape of the polymer-based implant to the implantation device used for administration and/or the shape of any particular geographic atrophy region in a subject. For example, see FIG. 4, wherein a geographic atrophy region is shown in the left image and a 3-D printed template for making a polymer-based implant that matches the shape and size of the geographic atrophy region is shown on in the right image. Solely by way of example, the polymer-based implant can be provided as a thin sheet (e.g., square, rectangular, circular, or any other geometric shape having a thickness ranging from 50 µm-100 µm), a thick disc (e.g., having a thickness ranging from greater than 100 µm to 5 mm, such as greater than 100 µm to 2 mm), or a thin or thick custom-fabricated shape that is configured to fit a geographic atrophy region determined using clinical fundus photographs. Methods of making these customized polymer-based implants are described herein.

Figure 5:
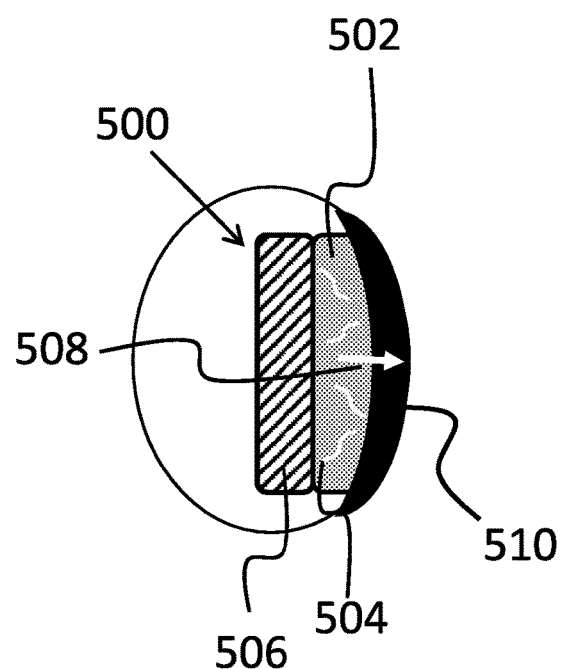
FIG. 5 is a schematic illustration of a polymer-based implant comprising a backing layer and illustrating how the backing layer can be used to promote unidirectional delivery of the therapeutic agent to the retina and prevent delivery to other regions of the eye.

In yet additional embodiments, the polymer-based implant can be modified to include a semi-permeable or fully impermeable backing layer on one surface of the polymer-based implant. In such embodiments, the backing layer facilitates unidirectional diffusion of any therapeutic agent present in the polymer-based implant. As such, therapeutic agent release can be directed toward a particular region of the eye (e.g., the retina) and away from, for example, the vitreous body. The backing layer can be a separate layer of material that can be formed from a polymer unit species disclosed herein that can be the same or different (in terms of chemical identity, molecular weight, crosslink content, and/or concentration). In embodiments comprising a backing layer, the lower density surface (that is, the surface of the polymer-based implant that is not adjacent to the backing layer) can be loaded with the therapeutic agent and the higher density surface can be free of any therapeutic agent. A schematic illustration of a polymer-based implant comprising a backing layer is illustrated in FIG. 5. According to the embodiment shown in FIG. 5, polymer-based implant 500 comprises polymer component 502, in which therapeutic agent 504 is suspended, and backing layer 506. Arrow 508 represents the direction of therapeutic agent release and as illustrated in FIG. 5, backing layer 506 prevents delivery of therapeutic agent 504 into the vitreous and thereby promotes delivery solely to retina 510.

Methods of Using Polymer-Based Implant Embodiments

Disclosed herein are embodiments of a method of using the polymer-based implant embodiments of the present disclosure. In some embodiments, the method comprises providing a polymer-based implant embodiment and implanting a polymer-based implant embodiment to a subject and particularly to an ocular region, and particularly at or near the retina, of the subject. The polymer-based implant can be implanted using any suitable method for positioning the polymer-based implant on or near the retina of a subject's eye. In some embodiments, the polymer-based implant is administered using an injector or other suitable implantation device/technique. In some embodiments, the injector can be a device comprising a hollow needle-like region in which the implant can be placed and then injected into the ocular region. In some embodiments, the injector can be a superotemporal port or cannula. In embodiments wherein the polymer-based implant is a solid sheet, it can be folded and placed in the injector. In some embodiments, the polymer-based implant can be implanted with the injector via intravitreal injection. In yet other embodiments, the polymer-based implant can be implanted with the injector via subretinal injection. Embodiments of the method wherein the polymer-based implant is administered using intravitreal injection can further comprise performing a partial (wherein less than substantially all of the vitreous is removed) or full vitrectomy (wherein substantially all of the vitreous is removed). In yet additional embodiments, the method can further comprise positioning the polymer-based implant in a particular location after injection. The method also can further comprise evaluating placement of the polymer-based implant using peri-operative optical coherence tomography. In an independent embodiment, the method does not comprise removing the polymer-based implant or any degradation product formed therefrom.

In particular disclosed embodiments, the polymer-based implant is used to deliver a retinal gene therapy to a subject's retina. In such embodiments, the therapeutic agent typically is a vector (or other gene-related therapy disclosed herein). The vector can be an AAV vector in some particular embodiments. Once implanted, the polymer-based implant can change phases as discussed herein to facilitate vector release such that the vector can infect any targeted cells and interact with the cells (e.g., promote and/or stimulate cell growth, or inhibit and/or prevent cell growth).

The polymer-based implant embodiments of the present disclosure can be used to treat retinal diseases, retinopathies, and other ocular diseases in which the retina is involved. In yet additional embodiments, the polymer-based implant can be used to improve retinal responsiveness to light. In some embodiments, the polymer-based implant can be used to treat any one or more of the following retinal disorders/diseases: central retinal vein occlusion, diabetic retinopathy (including proliferative diabetic retinopathy), proliferative vitreoretinopathy (PVR), retinal arterial occlusive disease, retinal detachment, uveitic retinal disease, non-retinopathy diabetic retinal dysfunction, retinoschisis, retinitis pigmentosa (e.g., X-linked retinitis pigmentosa), epiretinal membrane disorders, radiation retinopathy, retinal vein occlusion, chorioretinal degeneration, retinopathy of prematurity, acute macular neuroretinopathy, and any combinations thereof. In yet additional embodiments, the polymer-based implant can be used to treat one or more of the following ocular diseases/disorders: sympathetic opthalmia, Vogt Koyanagi-Harada syndrome, uveal diffusion, a posterior ocular condition (e.g., a condition caused by or influenced by an ocular laser treatment), posterior ocular conditions (e.g., conditions caused by or influenced by a photodynamic therapy), photocoagulation, branch anterior ischemic optic neuropathy, glaucoma, Usher syndrome, cone-rod dystrophy, Stargardt disease, inherited macular degeneration, Leber congenital amaurosis (e.g., RPE65-LCA2), congenital stationary night blindness, choroideremia, Bardet-Biedl syndrome, macular telangiectasia, Leber's hereditary optic neuropathy, and disorders of color vision (e.g., achromatopsia, protanopia, deuteranopia, and tritanopia), Behcet's disease, choroidal neovascularization, diabetic uveitis, histoplasmosis, macular degeneration (e.g., acute macular degeneration, non-exudative age related macular degeneration, and exudative age related macular degeneration), edema (e.g., macular edema, cystoid macular edema, diabetic macular edema, or combinations thereof), multifocal choroiditis, ocular trauma (e.g., trauma that affects a posterior ocular site or location), ocular tumors, and any combinations thereof. In particular disclosed embodiments, the polymer-based implant is not used as a vitreous humor replacement gel.

In some embodiments, disease-relevant canine models are used to evaluate efficacy of the disclosed polymer-based implant embodiments. Canine models are known in the art to be appropriate models for validating retinal gene therapies for diseases that affect cells of the ocular region, such as RPE (e.g., RPE65-LCA; BEST1-bestrophinopathies), and photoreceptors (e.g., CNGB3-ACHM, RPGR-XLRP, PDE6B-arRP, RPGRIP1-CRD, RHO-adRP, CNGB1-arRP, NPHP5-LCA). rAAV serotypes and cell-specific promoters have been shown to enable targeting these retinal populations and they show similar tropism and transduction activity in the human eye. In addition, the large volume of the canine eye, with diseases that affect the newly discovered cone-enriched fovea-like area, provides a model system to evaluate the delivery of doses susceptible to be used for targeting the human foveo-macular region. Also, although the canine retina is devoid of foveal pit, a "canine fovea-like" area within the center of the cone enriched canine area centralis has been identified. This ~100 µm diameter region has a peak density of cones that is similar to that found in the human fovea and is the only area of the canine retina where multiple (~3) rows of cone somatas can be found, and where cones have an elongated "rod-like" appearance. In addition, dogs with mutations in two different genes (BEST1, RPGR), that cause inherited maculopathies in humans, develop earliest disease at this newly-identified canine fovea-like area, which makes the canine area centralis and its fovea-like area in particular, a suitable model system to study delivery of therapeutic agents to the macular area.

In particular embodiments, the XLPRA2 dog, which carries a frameshift mutation in exon ORF15 of RPGR, is used for evaluating the efficacy of the disclosed polymer-based implants. The XLPRA2 dog has been extensively characterized and found to closely recapitulate one of the phenotypes within the human disease spectrum that shows regional predilection for the central retina. Also, in the XLPRA2/RPGR mutant dog, early photoreceptor disease along the visual streak has been found to begin and progress more severely within the fovea-like area thus making it a suitable model system to test and validate therapeutic strategies aimed at targeting via subretinal or intravitreal routes photoreceptors the human foveo-macula.

In additional embodiments, the RPE65 dog can be used as a model of RPE65-LCA2 to assess focal or pan-retinal targeting of the retinal pigment epithelium. The canine model of RPE65-LCA is well-characterized. Visual impairment in RPE65 deficient dogs is caused by a homozygous 4-bp deletion in RPE65 resulting in a frameshift and a premature stop codon which truncates the protein. The disorder is characterized by congenital night blindness with various degrees of visual impairment under photopic illumination. Histologically retinas show prominent RPE inclusions and loss of S cones at an early age with progressive degeneration of rods and L/M cones later in life. More recently, it was shown in a colony of RPE65 dogs from Michigan State University that early-onset severe photoreceptor degeneration occurs in a specific region of the area centralis, thus sharing some phenotypic similarities with a subset of RPE65-LCA2 patients that exhibit early central cone loss. The RPE65 dog model can therefore be used to refine polymer-based implant delivery of therapeutic agents to focal regions, such as the fovea-like area or to more extended retinal surfaces and thus can be used to assess utility in other RPE diseases (such, as Best Vitelliform Macular Dystrophy, or MERTK RP).

Methods of Making Polymer-Based Implant Embodiments

Also disclosed herein are embodiments of making the polymer-based implant of the present disclosure. In some embodiments, the polymer-based implant is made by combining a therapeutic agent with a polymer component. In some embodiments, the therapeutic agent is embedded in, dissolved in, dispersed in, adsorbed on, suspended in, or bound to the polymer component. In exemplary embodiments, the therapeutic agent is suspended in the polymer component. The polymer component, when combined with the therapeutic agent, typically is in the form of a hydrated gel. Once combined with the therapeutic agent, the resulting matrix of therapeutic agent/polymer component is dehydrated (e.g., lyophilized) such that little (e.g., no more than mere trace amounts) to no water is present in the polymer-based implant (e.g., the polymer-based implant is substantially water-free such that if any water is present, it is present only in trace amounts, such as between 0 wt % to 10% or less, such as 0 wt % to 8 wt %, or 0 wt % to 6 wt %, or 0 wt % to 4 wt %, or 0 wt % to 2 wt %). In some such embodiments, the polymer-based implant can consist of, or consists essentially of, the polymer component, the therapeutic agent, and, optionally, a pharmaceutically acceptable excipient. The dehydrated, solid polymer-based implant can then be compressed to provide the solid polymer-based implant. Any suitable compression technique can be used, including using a Carver Two-Post press. Thickness of the polymer-based implant is typically controlled during the compression process, such as by controlling the compression die thickness and initial mass of the polymer-based implant used. In some embodiments, compression is carried out for 10 minutes to 60 minutes, such as 20 minutes to 45 minutes, or 25 minutes to 30 minutes. Once the solid polymer-based implant is formed, it can be cut into any desired shape or size. In some embodiments, terminal sterilization of the solid polymer-based implant can be achieved using ethylene oxide gas sterilization. Excipients also may be included in the polymer-based implant to prevent any aggregation of the therapeutic agent included therein. Such excipients can be selected from any of the pharmaceutically-acceptable excipients described herein.

In some embodiments, the polymer-based implant can be configured to have a particular shape and/or size that matches a particular geographic atrophy region of a subject's eye. In such embodiments, a press used to compress the polymer-based implant can be fitted with 3-D printed plates for each geometry, digitally matched to the appropriate size and shape of the geographic atrophy region using image analysis software. These fabrication methods allow for near-infinite customization, including the incorporation of curvature to increase contact with the retina from the intravitreal approach. In some embodiments, the polymer-based implant can be configured to be a folded sheet that, after administration, can be expanded to cover a large region of the retina. In some embodiments, multiple polymer-based implants can be administered to increase the surface area of coverage obtained with the polymer-based implant.

In yet additional embodiments, a polymer-based implant comprising a backing layer can be made. In such embodiments, the polymer-based implant and the backing layer can be made separately and then molded and compressed together. In some such embodiments, the polymer-based implant can be made to comprise a particular polymer component species and/or degree of cross-linking amongst the polymer component. The backing layer can be made to comprise a different polymer component species from that of the polymer-based implant and/or to have a different degree of cross-linking as compared to the polymer-based component of the polymer-based implant.

Overview of Several Embodiments

Disclosed herein are embodiments of a polymer-based implant, comprising: a polymer component comprising one or more polymer species units, wherein the polymer component is capable of absorbing water such that the polymer component transitions from a gel phase to a liquid phase as a concentration of the polymer component in the polymer-based implant decreases; and a therapeutic agent suspended in the polymer component; wherein the polymer-based implant is a solid at ambient temperature and is substantially water-free.

In some embodiments, the polymer component has a structure satisfying a formula A-B-A, wherein B is a polymer species unit and each A independent is an end capping group attached to each end of the polymer species unit.

In any or all of the above-embodiments, the polymer species unit is a polyalkylene oxide.

In any or all of the above-embodiments, each end capping groups is an aliphatic group.

In any or all of the above-embodiments, the polymer component is octadecane-poly(ethylene glycol)-octadecane.

In any or all of the above-embodiments, the therapeutic agent is selected from a vector, a pharmaceutical drug, an optogenetic therapeutic agent, a naturally and/or non-naturally occurring CRISPR-Cas9 system, or any combination thereof.

In any or all of the above-embodiments, the vector is an AAV vector, a recombinant AAV vector, or any combination thereof.

In any or all of the above-embodiments, the vector is capable of infecting retinal cells, photoreceptor (rod and/or cone) cells, retinal ganglion cells, RPE cells, Müller cells, retinal pigmented epithelial cells, bipolar cells, amacrine cells, astrocytes, microglia, pericytes, vascular endothelium cells, horizontal cells, and other cells located in the ocular region.

In any or all of the above-embodiments, the therapeutic agent is suspended in the polymer component.

In any or all of the above-embodiments, the polymer-based implant further comprises a backing layer that facilitates unidirectional delivery of the therapeutic agent to the retina and away from the vitreous or other ocular region.

In any or all of the above-embodiments, the backing layer comprises one or more polymer species units that are the same as the one or more polymer species units of the polymer component and wherein the one or more polymer species units of the backing layer have a different number of crosslinks as compared to the one or more polymer species units of the polymer component.

In any or all of the above-embodiments, the backing layer comprises one or more polymer unit species that does not absorb water.

In any or all of the above-embodiments, the polymer-based implant becomes transparent upon exposure to an aqueous environment.

In any or all of the above-embodiments, the polymer component is octadecane-poly(ethylene glycol)-octadecane and the therapeutic agent is an AAV vector.

Also disclosed herein are embodiments of a method, comprising: providing a polymer-based implant according to any one or more of the above embodiments; and implanting the polymer-based implant into an ocular region of a subject.

In any or all of the above-embodiments, implanting is performed via injection.

In any or all of the above-embodiments, the injection is an intravitreal injection, a subretinal injection, or a combination thereof.

In any or all of the above-embodiments, the method further comprises performing a partial or full vitrectomy.

In any or all of the above-embodiments, the method does not comprise removing the polymer-based implant or any degradation product formed therefrom.

Also disclosed herein are embodiments of a method, comprising treating a retinal disease and/or a retinopathy by implanting the polymer-based implant according to any one or more of the above embodiments in an ocular region of a subject having, or capable of developing, the retinal disease and/or retinopathy.

In any or all of the above-embodiments, the retinal disease and/or a retinopathy is selected from central retinal vein occlusion, diabetic retinopathy, proliferative vitreoretinopathy, retinal arterial occlusive disease, retinal detachment, uveitic retinal disease, non-retinopathy diabetic retinal dysfunction, retinoschisis, retinitis pigmentosa, epiretinal membrane disorders, radiation retinopathy, retinal vein occlusion, chorioretinal degeneration, retinopathy of prematurity, acute macular neuroretinopathy, sympathetic opthalmia, Vogt Koyanagi-Harada syndrome, uveal diffusion, a posterior ocular condition, posterior ocular conditions, photocoagulation, branch anterior ischemic optic neuropathy, glaucoma, Usher syndrome, cone-rod dystrophy, Stargardt disease, inherited macular degeneration, Leber congenital amaurosis, congenital stationary night blindness, choroideremia, Bardet-Biedl syndrome, macular telangiectasia, Leber's hereditary optic neuropathy, and disorders of color vision, Behcet's disease, choroidal neovascularization, diabetic uveitis, histoplasmosis, macular degeneration, edema, multifocal choroiditis, ocular trauma, ocular tumors, and any combinations thereof.

In any or all of the above-embodiments, the retinal disease is RPE65-LCA2 or X-linked retinitis pigmentosa.

Also disclosed herein are embodiments of a method of making the polymer-based implant according to any one or more of the above embodiments, comprising: combining the polymer component and the therapeutic agent to provide a therapeutic agent-containing polymer matrix; and lyophilizing the therapeutic agent-containing polymer matrix to provide the solid polymer-based implant.

EXAMPLES

Example 1

The variable phase polyethylene glycol (PEG)-n-octadecane copolymer was synthesized under inert nitrogen atmospheric conditions using a Schlenk line and oven dried glassware. Approximately 1 molar equivalent or 50 g of PEG (10 kDa, Sigma) was added to a 1-L 3-neck round bottom flask and dissolved in 300 ml of 1,4-dioxane (dry). Temperature was monitored continuously in one arm and nitrogen was continuously flushed in another, leaving the third for additions. The mixture was heated to 70° C. using a water bath. Once the PEG was fully dissolved, the reaction vessel was cooled to room temperature again using a water bath. Approximately 20 molar equivalents or 4.05 g of sodium hydride (60% 23.99 g/mol, Aldrich) was added in 4 aliquots and stirred for 1 hour. After 20 minutes the reaction mixture solidified and the water bath was heated to 40-45° C. to redissolve the solid material. Next, 20 molar equivalents or 34.2 ml of >97% 1-bromooctadecane (333.39 g/mol, Aldrich) was added dropwise, resulting in a slightly opaque yellow-orange solution. The reaction mixture was stirred at room temperature for 20 hours followed by concentration of the crude reaction mixture under vacuum, yielding a dark yellow-brown oil. The crude oil was dissolved in 200 ml of methylene chloride and extracted with 1.0 M HCl. The pH of the aqueous phase was 1.0. A persistent emulsion was observed throughout the extraction. The organic phase was dried with magnesium sulfate, filtered via vacuum filtration, and once again concentrated under vacuum. The concentrate was a transparent yellow-orange oil, which was then purified via column chromatography using diethyl ether and methylene chloride. The silica gel column was prepared using diethyl ether and the crude product was loaded on the column. The desired end product, OD-PEG-OD (OPO), precipitated on top of the column. Residual bromooctadecane and its elimination product were eluted using diethyl ether. The final OPO product was isolated via elution with methylene chloride as a white powder with a final yield of approximately 30%.

Figure 6:
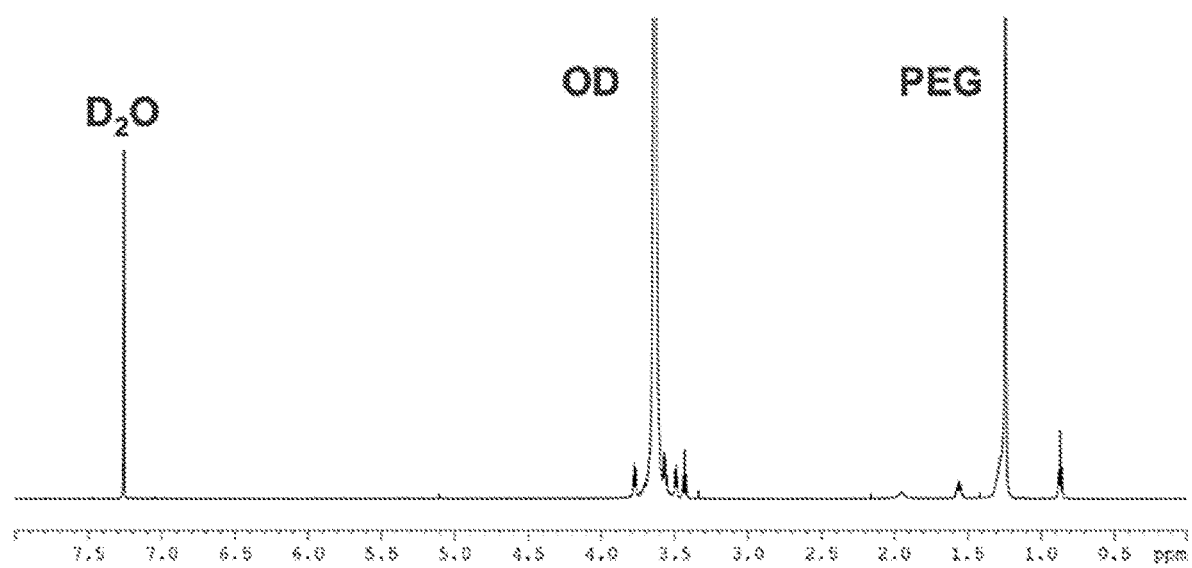
FIG. 6 is a proton nuclear magnetic resonance spectrum of a representative polymer component, namely octadecane-poly(ethylene glycol)-octadecane (or "OPO").

FIG. 6 shows the proton nuclear magnetic resonance ($^1$H-NMR) spectrum of the resulting polymer component. A weighed sample of the dry OPO material was dissolved in ethanol (1 mL) than pre-injected into the volumetric tube via the septum cap. The sample rested for a minimum of 1 hour and a maximum of 24 hours. A 500 ul aliquot was injected into a standard NMR tube previously flushed with $N_2$. The spectrum was acquired for a range of 120-256 scans and plotted. For each sample, one full 0-10 ppm spectrum was plotted alongside two expansions of the relevant region for integration; thus, the data obtained were for three separate integrations of the spectrum. The spectrum shown in FIG. 6 exhibits the expected degree of substitution for PEG along with sufficient resolution and separation for subsequent analyses. And, this spectrum demonstrates the ability to consistently synthesize a pure product as the product is free of contaminating reagents.

Example 2

Figure 7:
FIG. 7 shows an implant before and after gamma irradiation, which confirms that the implant is able to resist mass loss and changes in appearance.

AAV was suspended in the hydrated gel and lyophilized prior to fabricating the solid polymer-based implants, which were prepared using a Carver Two-Post press. Briefly, lyophilized OD-PEG-OD was placed between Teflon blocks and subsequently compressed for 30 minutes with 2,500 lbs (2×). The resulting sample was an opaque, solid polymer-based implant that could be cut to any size or shape. Thickness of the polymer-based implant can be controlled by the die thickness and initial mass. In particular examples, the thickness was 22-23 mg of the OPO. Terminal sterilization of the solid polymer-based implant was achieved through gamma irradiation with minimal loss in material mass and no gross changes in appearance, as can be seen in FIG. 7. The phase diagram for the OPO implant used in this example is provided in FIG. 1, which is discussed above.

Example 3

Figure 8:
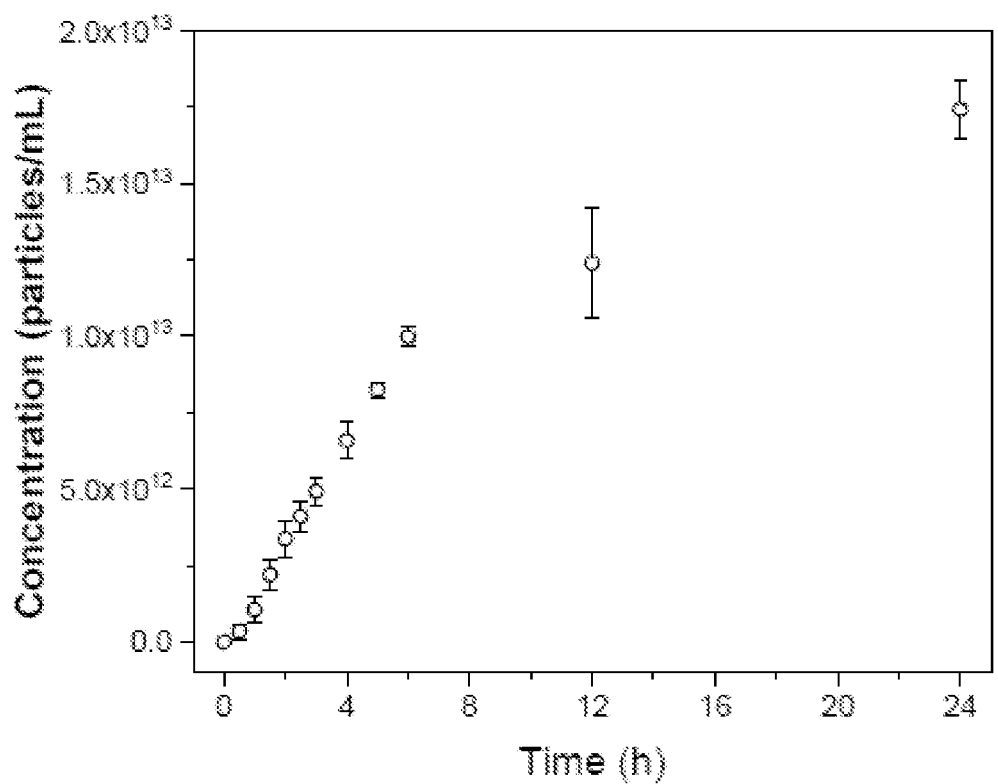
FIG. 8 is a graph of concentration (particles/mL) as a function of time (hours) showing that fluorescent nanoparticles, used as a surrogate for a therapeutic agent, can be successfully released from a polymer-based implant of the present disclosure.

The fully characterized solid OPO implant was tested in several benchtop simulations of in vivo use as a preliminary step in determining suitability as a retinal gene therapy platform. Release of fluorescent nanoparticles as a surrogate for AAV was quantified over time from the OPO implant (FIG. 8). A 25% (w/v) OD-PEG-OD gel containing 50 nm diameter nanoparticles was prepared by dissolving 250 mg of OD-PEG-OD in 1 ml of an aqueous solution of 50 nm Fluoresbrite Plain YG nanoparticles with a concentration of $3.64 \times 10^{14}$ particles/ml. Once in solution the solid was lyophilized, yielding a yellow/orange colored solid. Approximately 20 mg of the solid material (n=3) was exposed to physiological conditions, i.e., DPBS (pH=7.4), using a stir rate of 8 RPM at 37° C. Release media in triplicate samples were collected every 30 minutes for 3 hours and thereafter every hour up to 6 hours followed by every 6 hours until reaching 24 hours. Nanoparticle concentrations in 250 μl release media aliquots were determined using UV-Vis spectroscopy, where emission intensities at 510 nm were measured and compared to a previously validated standard curve. A "burst" release of nanoparticles over 6 hours was observed, with a lower amount of nanoparticles released over the remaining 18 hour. This corresponds well with the desired in vivo AAV release behavior, namely that the majority of AAV would be released before the gel has absorbed sufficient water to transition to the liquid phase. Adjustments to AAV release can be achieved by modulating the porosity of the gel network by increasing or decreasing crosslinking density (to slow down or speed up AAV release, respectively).

Example 4

Figure 9:
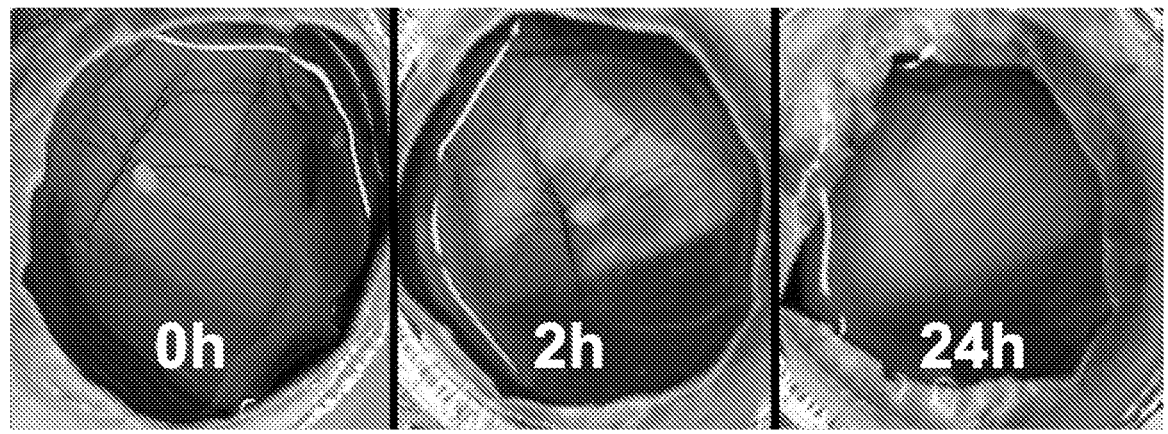
FIG. 9 includes images of freshly enucleated bovine eyes implanted with a polymer-based implant embodiment comprising fluorescent nanoparticles and which shows that the implant remains in place and exhibits hydration and dissolution over time.

The fluorescent OPO implants were next placed on the retina through the vitreous in an ex vivo bovine eye experimental setup (FIG. 9). Freshly enucleated, never frozen eyes were shipped overnight (Pel-Freez Biologicals) and used immediately for these studies. The OPO implant was clearly observed throughout the study, along with the phase change and spreading of the fluorescent nanoparticles contained therein. The retinal adhesive properties of the OPO implant were preliminarily confirmed as there was no movement of the OPO implant over time.

Example 5

Figure 10:
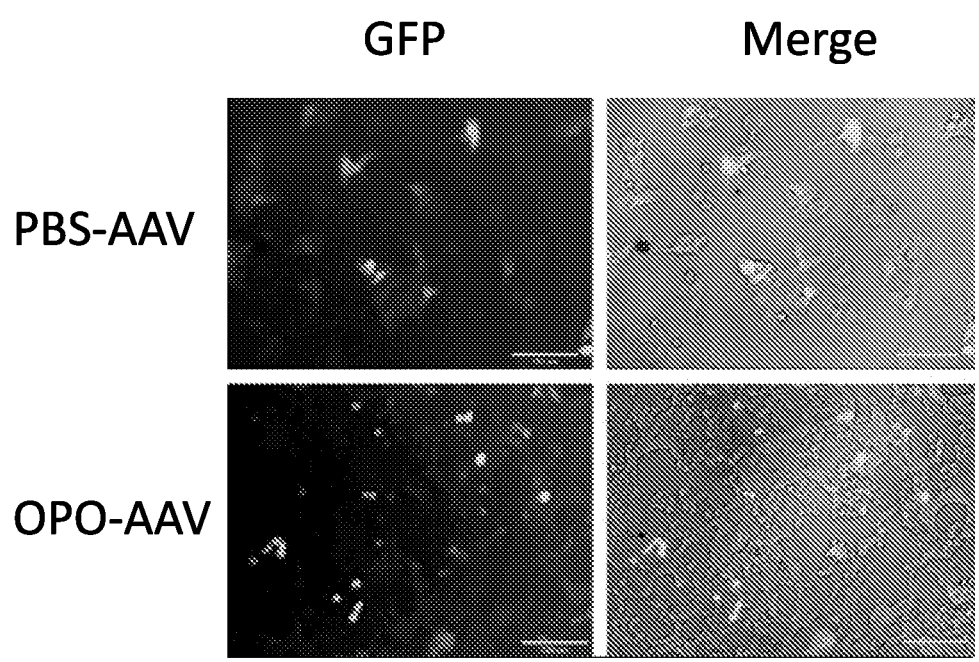
FIG. 10 includes images of results obtained from using in vitro testing of virus release from a representative polymer-based implant, wherein an adeno-associated virus (AAV) vector is released from the gel-phase of the polymer-based implant and retains activity as evidenced by transduction of HEK 293 cells in comparison to control samples wherein the AAV vector is delivered in a PBS buffer.
Figure 12A:
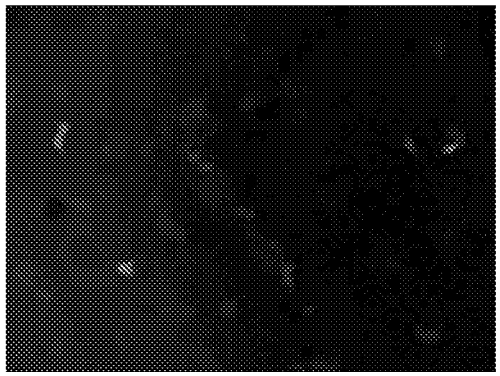
FIGS. 12A-12F are images showing transduction of cells after 1 day (FIGS. 12A and 12B), 2 days (FIGS. 12C and 12D), or 3 days (FIGS. 12E and 12F) after 20 minute incubation with 100 uL of gel+AAV (FIGS. 12A, 12C, and 12E) or 500 uL of gel+AAV (FIGS. 12B, 12D, and 12F).
Figure 12B:
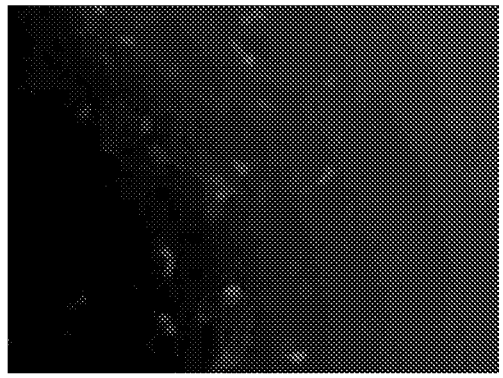
Figure 12C:
Figure 12D:
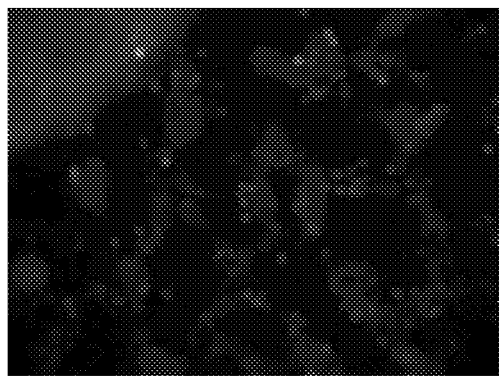
Figure 12E:
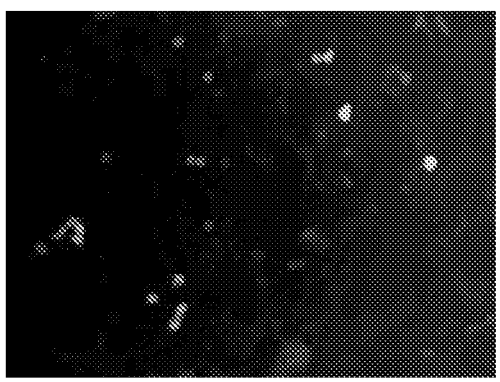
Figure 12F:
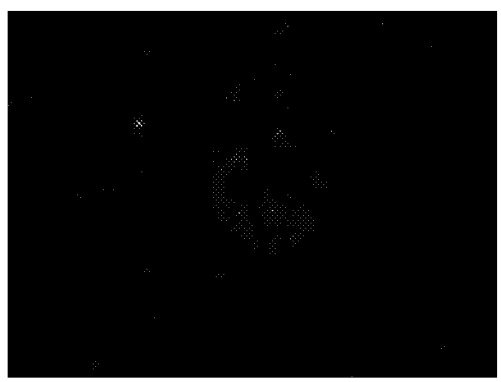

To test the ability of OPO-encapsulated AAV to be released and subsequently infect cells, a series of in vitro assays was performed using AAV diluted to a MOI (multiplicity of infection) of 1500, a concentration determined to lead to ~50% rate of transduction in HEK 293 cells in vitro. The virus was either suspended in PBS or loaded into the OPO implant. Virus was then either pipetted into one well of a 6 well plate, or the OPO implant was placed in a small cage suspended above the cells. The number of infected cells was equal in wells treated with PBS-diluted or OPO-embedded virus, indicating complete release of virus and no change in infectivity of the virus (see FIG. 10). Additional results of a similar example are illustrated in FIGS. 11A-11I, which show results for days one (first row), two (second row), and three (third row) comparing untreated cells (FIGS. 11A, 11D, and 11G) and cells treated with 100 uL (FIGS. 11B, 11E, and 11H) and 500 uL (FIGS. 11C, 11F, and 11I). Similar conditions were used as above for FIG. 10 for these embodiments. Images showing transduction of cells after one day, two days, and three days after a 20-minute incubation with 100 uL of gel+AAV or 500 uL of gel+AAV are provided by FIGS. 12A-12F. These results suggest that the AAV particles are fully released and maintain activity, which can be further studied in the context of scalable manufacturing techniques in this aim. Assays also can incorporate primary cultures of RPE cells.

Example 6

Freshly enucleated rabbit eyes, which are closer in size and anatomy to human eyes than bovine eyes, and freshly obtained ex vivo human eyes are used to establish the appropriate surgical procedures for each of the polymer-based implant shapes, followed by validation in canines, including a 2 mm disc designed to cover the area centralis in canine studies, multiple 25 mm² tiles, and larger flexible sheets unrolled to cover the entire retina or predetermined, irregular shapes. An expanded superotemporal port (up to 4 mm) can be used to implant the 2 mm disc. In other embodiments, larger OPO implants can be folded into an injector derived from the tool developed for injecting large RPE monolayers on a substrate for cell therapy. Polymer-based implants are loaded inside the injector and, once the instrument is positioned in front of the target area, are pushed to its optimal location. Peri-operative OCT allows for checking the proper placement. Proper unfolding of the various geometries is validated in vitro. The contribution of vitreous to AAV diffusion can be evaluated using fluorescent nanoparticle surrogates. In particular embodiments, vectors that promote expression of GFP are used in the polymer-based implant. Such embodiments can be implanted in vivo in WT dogs, which are kept under dorsal recumbency immediately after implantation for a suitable period of time for the polymer-based implant to rehydrate and release its AAV load.

Example 7

In this example, the directionality of particle movement using fluorescent nanoparticles in a transwell assay can be assessed to evaluate performance of a polymer-based implant embodiment comprising a backing layer. In this example, the gel is fully submerged and hydrated and elution of nanoparticles is simultaneously monitored in the upper and lower chamber. The transwell membrane should not present a significant barrier to diffusion. Particle elution over 24 hours is determined for both chambers. These results are qualitatively confirmed using fluorescence microscopy of the polymer-based implants in solution.

Example 8

In this example, nine male XLPRA2/RPGR mutant dogs are transplanted at the time of disease onset (~6 weeks of age) with a 2 mm diameter OPO implant loaded with AAV-RPGR viral particles at one of three concentrations (1×, 10×, and 100×) predetermined based on results conducted in WT dogs. Dogs are randomly allocated to one of the three treatment groups (n=3 dogs/group). In all treatment groups, dogs have their contralateral eye implanted with the same type of OPO implant loaded with an AAV-GFP construct (same three doses as for AAV-RPGR). This negative control allows to verify that the AAV tropism towards canine photoreceptors (established in WT dogs) is retained in diseased/mutant retinas.

The AAV-RPGR construct comprises an AAV plasmid containing the same human stabilized RPGR cDNA sequence as previously described and used in canine proof of concept studies. Unless a more potent promoter capable of driving transgene expression to both rods and cones is validated in NHP and WT dogs' retinas, the human 292-nt portion of the human GRK1 promoter is used, as this promoter has been shown to be effective at turning on transgene expression in both classes of photoreceptors in dogs and in NHPs. The AAV plasmid is packaged in an AAV capsid variant that can efficiently target rods and cones in both NHPs and WT dogs. After epiretinal implantation, the dogs are followed for 18 weeks. Weekly ophthalmic examinations including fundus photography are performed to monitor ocular tolerability to the polymer-based implants. Longitudinal assessment of GFP expression (in the contralateral eyes), and structural integrity of the retinas is conducted by non-invasive cSLO/OCT imaging (Spectralis HRA/OCT2) at pre-implantation (~6 weeks of age=baseline), 12 weeks of age, and before termination at 24 weeks of age. In depth qualitative and quantitative analysis of ONL thickness is conducted after semi-manual segmentation of individual longitudinal reflectivity profiles from overlapping (30°×20°) raster OCT scans. Topographical maps of ONL thickness are examined to determine whether ONL rescue is seen in the area corresponding to the polymer-based implant implantation. The dimension of the region of rescue in comparison to that of the polymer-based implant will inform on the extent of potential tangential diffusion of AAV out of the polymer-based implant, and its ability to treat or not an area larger than that of the polymer-based implant.

Full field ERG is used to assess any functional recovery and can be performed at baseline, and 12 and 24 weeks of age. Following termination, eyes are processed for retinal histology and immunohistochemistry. Specifically, expression of RPGR (using a commercially-available antibody directed against human RPGR, but that does not recognize canine RPGR) can be used and its localization to the connecting cilium assessed. Photoreceptor integrity (including inner/outer segment structure, connecting cilium, and synaptic terminals) can be evaluated in RPGR expressing (i.e., treated) and non-expressing (i.e., untreated) areas and compared, using previously validated cell-specific antibodies. This can include using antibodies directed against (rhodopsin, and cone opsins) to examine correction of opsin mislocalization, but also of bipolar cells (e.g., PKCα and Goα) to assess the impact of photoreceptor rescue of inner retinal remodeling. Dosage information can be obtained, particularly dosages suitable for use with a 2 mm diameter area of the central XLPRA2/RPGR retina that confers photoreceptor rescue.

Example 9

Dosing information gained from the example of above is used in this example. In particular, four dogs are used, and each animal has one eye implanted with a polymer-based implant (e.g., an OPO-AAV-RPGR implant), and the contralateral eye with a determined dose of a polymer-based implant (e.g., an OPO-AAV-GFP implant) that leads to detectable GFP expression in remaining photoreceptors during the early phase of the disease. Similar assessment methods as described above, including clinical ophthalmic exams, in vivo cSLO/OCT imaging, ERG, are performed every three months, and histology/assessment done at termination. In some embodiments, psychophysical visual training and testing of all dogs can be conducted using a well-established obstacle avoidance course and a forced 2-choice Y maze, which have both been successfully used to demonstrate rescued visual behavior after subretinal AAV-RPGR gene therapy in this model. These more advanced phases of degeneration in dogs can be used for modeling the situation encountered with human RPGR-XLRP patients who are frequently diagnosed when substantial ONL loss has already occurred. In addition, this example can evaluate the impact (positive or negative) of inner retinal remodeling on retinal permeability to AAVs released on the preretinal surface. In such embodiments, dogs are assessed every three months by eye examination, cSLO/OCT, ERG, visual behavior and histology/IHC at termination (90 weeks of age). If ONL rescue is seen with the 2 mm diameter polymer-based implant but there is minimal evidence of preserved visual function, then a wider retinal surface can be targeted using large (e.g., 5 mm×5 mm) polymer-based implants. In some embodiments, subretinal delivery of a 150 µL volume covers approximately 60±13 mm$^2$ of the retinal surface in an adult (12 week-old) dog; thus, tiling of two to three large (25 mm$^2$) polymer-based implants would cover a similar surface and enable direct comparison to results obtained using subretinal delivery of 150 μL of AAV-RPGR.

Example 10

The RPE65 dog model of LCA2 can be used in this example to validate that the disclosed polymer-based implant embodiments can be used to target diseases that affect the RPE. As rod function is severely impaired from birth in these dogs due to lack of RPE65 isomerase activity in the RPE, restoration of RPE65 expression via gene augmentation can rapidly correct the visual deficit and be quantifiably assessed by ERG and visual behavior. In this example, an AAV that efficiently targets the RPE after intravitreal delivery can be used to package the human RPE65 cDNA (1602nt) under control of the 823-nt human RPE65 promoter. A similar experimental design as described in Example 8 can be used, except that dogs are treated at 12 weeks of age, when the size of the globe is sufficiently large (axial globe length: 16-18 mm) to enable surgical implantation of large (25 mm$^2$) polymer-based implants that can be tiled together to cover a retinal surface comparable to that targetable by subretinal injection of an AAV solution. Dogs are monitored by eye examination, cSLO/OCT imaging, and ERG for 18 weeks post-implantation. At termination, eyes are processed for histology to evaluate any potential deleterious effect of the retina, and to assess reduction of RPE inclusion and expression of RPE.

Example 11

Figure 13A:
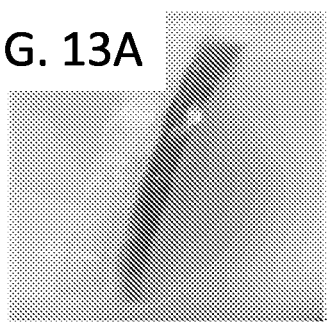
Figure 13B:
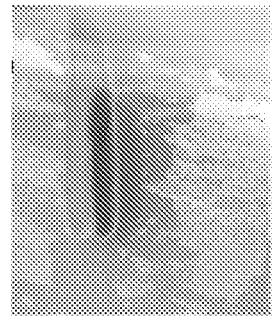
Figure 13C:
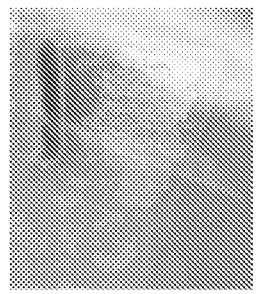
Figure 13D:
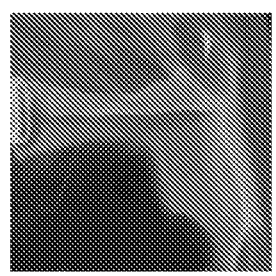
Figure 13E:
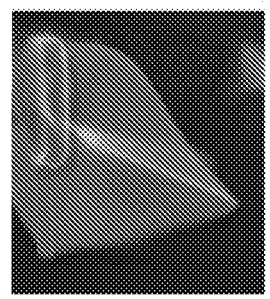

In this example, the unidirectional diffusion of AAV from the OPO implant (with movement away from the retina significantly hindered) was evaluated. A dual layered implant was fabricated and is shown in FIGS. 13A-13E. A blank OPO implant was affixed to a FITC-loaded implant that was then placed upright in PBS (FIG. 13A). Diffusion of FITC was monitored over time (1 minute=FIG. 13B; 5 minutes=FIGS. 13C and 13D; and 15 minutes (FIG. 13E) and qualitatively showed diffusion from the FITC side only.

Example 12

Figure 14A:
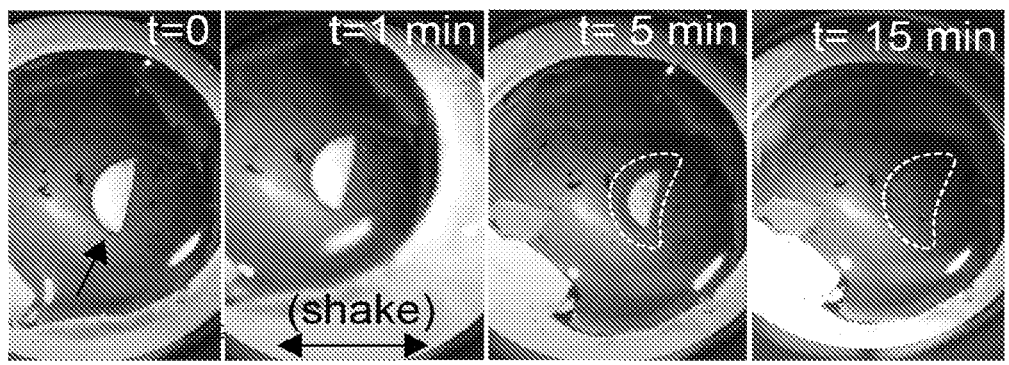
Figure 14B:
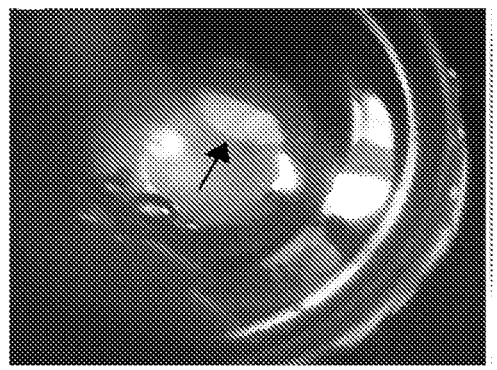
Figure 14C:
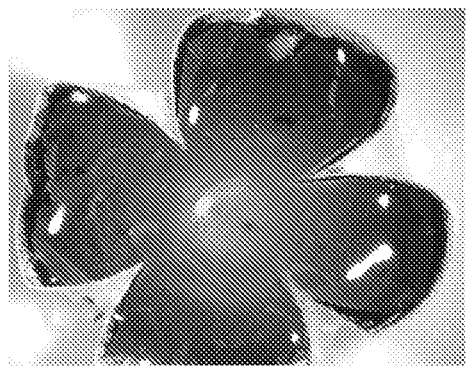
Figure 14D:
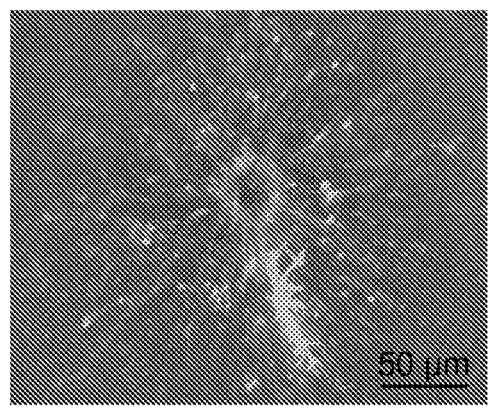
Figure 14E:
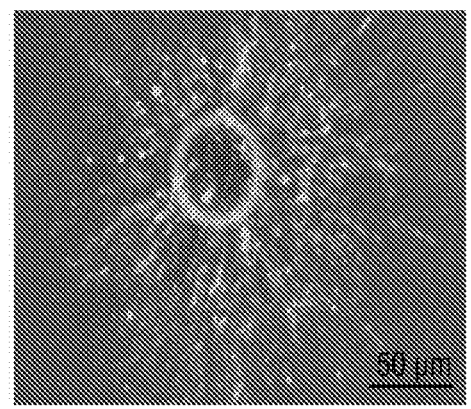

In this example, 7m8-CAG-GFP was loaded into 25% OPO material and implanted in primate retinas. First, the material was tested ex vivo in primate eyes for retinal adhesiveness and for the timing of release. An implant was placed onto maculae of eyes kept at 37° C. (FIG. 14A). One minute after the implant adhered to the retina, the eye was vigorously shaken. The implant remained in place. Fifteen minutes after placement, the implant was still in place above the macula, but had completely transitioned to a gel phase. Next, implant procedures were performed in two primates. Two dosages were tested. The first experiment was a safety study for the implant material, and a minimal amount of AAV was loaded into the implant (5E+8 vector genomes). This low dosage is 0.5 log lower than the lowest dosage tested in Phase I/IIa XLRS clinical trials and 3 logs lower than dosages of 7m8 previously tested intravitreally in primates. The procedure was performed as follows: 1) Limited conjunctival peritomy overlying the sclerotomy site; 2) Diathermy over the sclerotomy site for hemostasis; 3) Strategic transconjuctival placement of 3 working ports: infusion, chandelier, instrument; 4) Three port pars plana limited posterior preretinal vitrectomy; 5) Minimal sclerotomy; 6) Placement of implant above macula; 7) Closure of sclerotomy. FIG. 14B shows the implant (arrow) entering the primate eye. Two months after implantation, retinas were flat mounted and imaged. Dissection of the eye revealed that the retinas were healthy, and no trace of the implant remained (FIG. 14C). Flat mount imaging of retinas revealed that even with this very low dose, GFP expression was apparent in the fovea of both eyes (FIGS. 14D and 14E) under the area where the implants were placed, but not in peripheral regions, indicating that vector was successfully encapsulated, released and directed to the macula. A second primate underwent a procedure to implant OPO loaded with 100× larger dosage of AAV (5E+10 vg), and no immune response was noted four weeks after the procedure.

In view of the many possible embodiments to which the principles of the present disclosure may be applied, it should be recognized that the illustrated embodiments are only examples and should not be taken as limiting scope. Rather, the scope of the present disclosure is defined by the following claims. We therefore claim as our invention all that comes within the scope and spirit of these claims.

We claim:

1. A polymer-based implant, comprising:
   a polymer component that is octadecane-poly(ethylene glycol)-octadecane, wherein the polymer component is capable of absorbing water such that the polymer component transitions from a gel phase to a liquid phase as a concentration of the polymer component in the polymer-based implant decreases; and
   a therapeutic agent suspended in the polymer component;
   wherein (i) the polymer-based implant is a solid at ambient temperature and comprises water in an amount ranging from 0 wt % to an amount less than 10 wt %, and (ii) the polymer-based implant is not in the form of particles.

2. The polymer-based implant of claim 1, wherein and the therapeutic agent is selected from a vector, a pharmaceutical drug, an optogenetic therapeutic agent, a naturally and/or non-naturally occurring CRISPR-Cas9 system, or any combination thereof.

3. The polymer-based implant of claim 2, wherein the vector is an AAV vector, a recombinant AAV vector, or any combination thereof.

4. The polymer-based implant of claim 2, wherein the vector is capable of infecting retinal cells, photoreceptor cells, retinal ganglion cells, RPE cells, Müller cells, retinal pigmented epithelial cells, bipolar cells, amacrine cells, astrocytes, microglia, pericytes, vascular endothelium cells, horizontal cells, and other cells located in the ocular region.

5. The polymer-based implant of claim 1, further comprising a backing layer that facilitates unidirectional delivery of the therapeutic agent to the retina and away from the vitreous or other ocular region.

6. The polymer-based implant of claim 5, wherein the backing layer comprises poly(ethylene glycol) having a different number of crosslinks as compared to a number of any crosslinks present in the polymer component.

7. The polymer-based implant of claim 5, wherein the backing layer comprises a polymer unit species that does not absorb water.

8. The polymer-based implant of claim 1, wherein the polymer-based implant becomes transparent upon exposure to an aqueous environment.

9. The polymer-based implant of claim 1, wherein the therapeutic agent is an AAV vector.

10. A polymer-based implant, comprising:
    a mixture of (i) a polymer component having structure according to a formula A-B-A, wherein each A independently is an aliphatic end capping group and B comprises a polymer species unit; and (ii) a therapeutic agent; provided that the polymer species unit is not a carbonyl-containing polymer and the polymer-based implant does not comprise micelles.

11. A method, comprising:
providing the polymer-based implant of claim 1; and
implanting the polymer-based implant into an ocular region of a subject.

12. The method of claim 11, wherein implanting is performed via intravitreal injection or subretinal injection.

13. The method of claim 11, further comprising performing a partial or full vitrectomy.

14. The method of claim 11, wherein the method does not comprise removing the polymer-based implant or any degradation product formed therefrom.

15. A method, comprising treating a retinal disease and/or a retinopathy by implanting the polymer-based implant of claim 1 in an ocular region of a subject having, or capable of developing, the retinal disease and/or retinopathy.

16. The method of claim 15, wherein the retinal disease and/or a retinopathy is selected from central retinal vein occlusion, diabetic retinopathy, proliferative vitreoretinopathy, retinal arterial occlusive disease, retinal detachment, uveitic retinal disease, non-retinopathy diabetic retinal dysfunction, retinoschisis, retinitis pigmentosa, epiretinal membrane disorders, radiation retinopathy, retinal vein occlusion, chorioretinal degeneration, retinopathy of prematurity, acute macular neuroretinopathy, sympathetic opthalmia, Vogt Koyanagi-Harada syndrome, uveal diffusion, a posterior ocular condition, posterior ocular conditions, photocoagulation, branch anterior ischemic optic neuropathy, glaucoma, Usher syndrome, cone-rod dystrophy, Stargardt disease, inherited macular degeneration, Leber congenital amaurosis, congenital stationary night blindness, choroideremia, Bardet-Biedl syndrome, macular telangiectasia, Leber's hereditary optic neuropathy, and disorders of color vision, Behcet's disease, choroidal neovascularization, diabetic uveitis, histoplasmosis, macular degeneration, edema, multifocal choroiditis, ocular trauma, ocular tumors, and any combinations thereof.

17. A method of making the polymer-based implant of claim 1, comprising combining the polymer component and the therapeutic agent to provide a therapeutic agent-containing polymer matrix and lyophilizing the therapeutic agent-containing polymer matrix.

* * * * *